United States Patent [19]

Leban

[11] 3,952,646

[45] Apr. 27, 1976

[54] APPARATUS FOR DECAPPING THE STEMS OR CAPS OF STRAWBERRIES

[76] Inventor: Evan Leban, 7266 River Road, Sodus, Mich. 49126

[22] Filed: Dec. 9, 1974

[21] Appl. No.: 530,980

[52] U.S. Cl. .................................. 99/639; 99/635; 99/643
[51] Int. Cl.² .................. A23N 15/02; A23N 15/04
[58] Field of Search ............. 99/486, 537, 567, 635, 99/636, 637, 639, 642, 643, 546

[56] References Cited
UNITED STATES PATENTS

| | | | |
|---|---|---|---|
| 1,565,648 | 12/1925 | Hoyt | 99/643 |
| 1,640,745 | 8/1927 | Ayars | 99/643 |
| 3,537,495 | 11/1970 | Pearson | 99/637 |

Primary Examiner—Robert W. Jenkins
Assistant Examiner—James A. Niegowski
Attorney, Agent, or Firm—Charles B. Cannon

[57] ABSTRACT

The apparatus is comprised of a frame which supports a plurality of conveying troughs, an upper rotating drum, a lower rotating drum and a stationary decapping blade. The strawberries are first deposited in the troughs which then convey the strawberries to the lower rotating drum. The strawberries are then deposited singly into one of a plurality of cylindrical carrier pockets which are disposed in a spaced relationship upon the lower rotating drum. Each of the pockets communicates with a source of sequentially applied air pressure. The upper rotating drum is in a closely spaced and parallel relationship with the lower rotating drum. A plurality of spaced ports are located in the upper drum and communicate with a sequentially applied vaccum source. The two drums are rotated in a timed relationship so that the pockets and ports come into sequential communication with each other at the same time a pressure and a vacuum is sequentially applied to the respective pockets and ports. The cap of the strawberry is thus held in the area between the upper drum and the cylindrical pocket while the body of the strawberry remains within the pocket. The strawberry held in such a position then passes the decapping blade and is decapped. The cap of the strawberry is carried away through the vacuum port and the body of the strawberry is deposited on a discharge belt.

41 Claims, 46 Drawing Figures

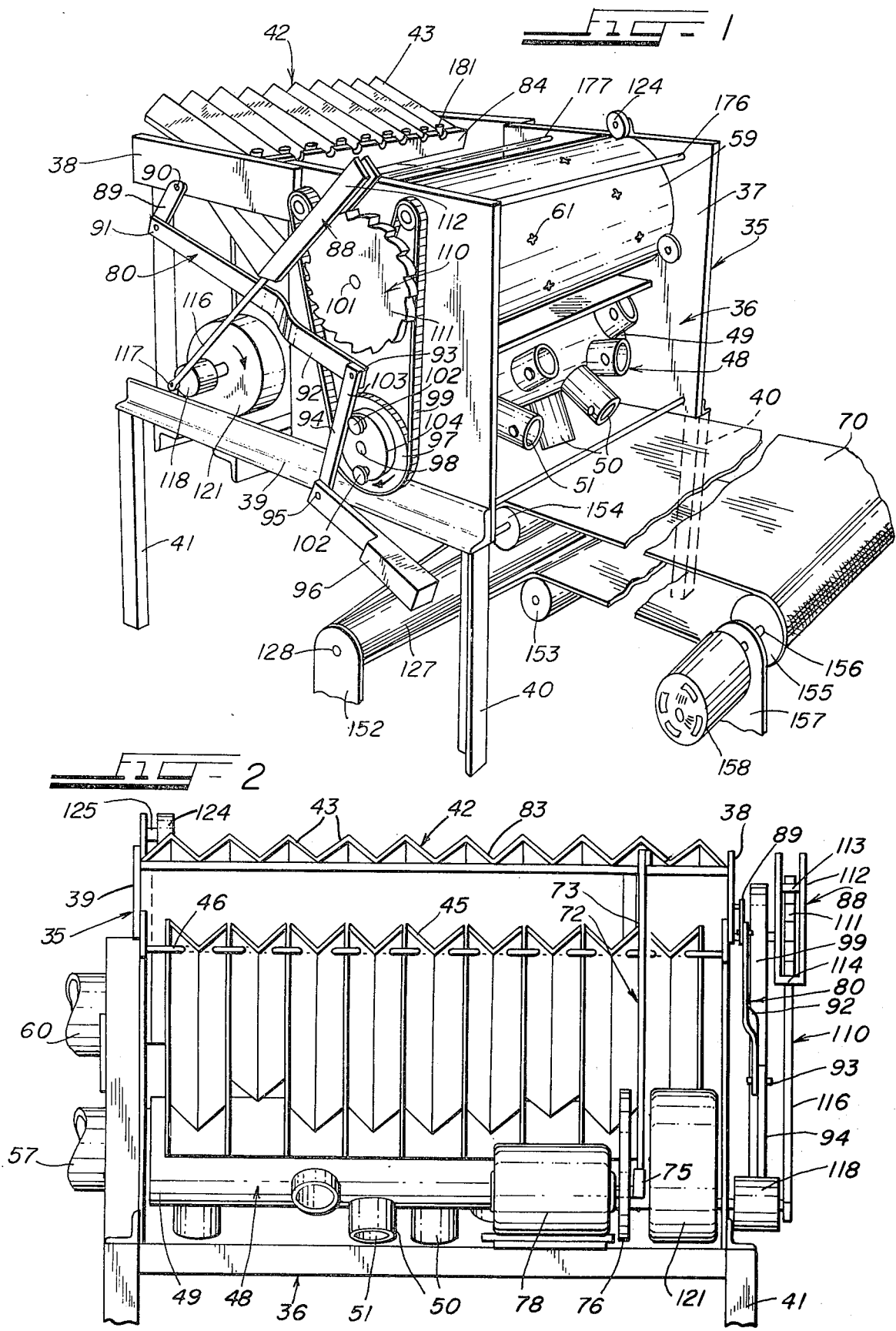

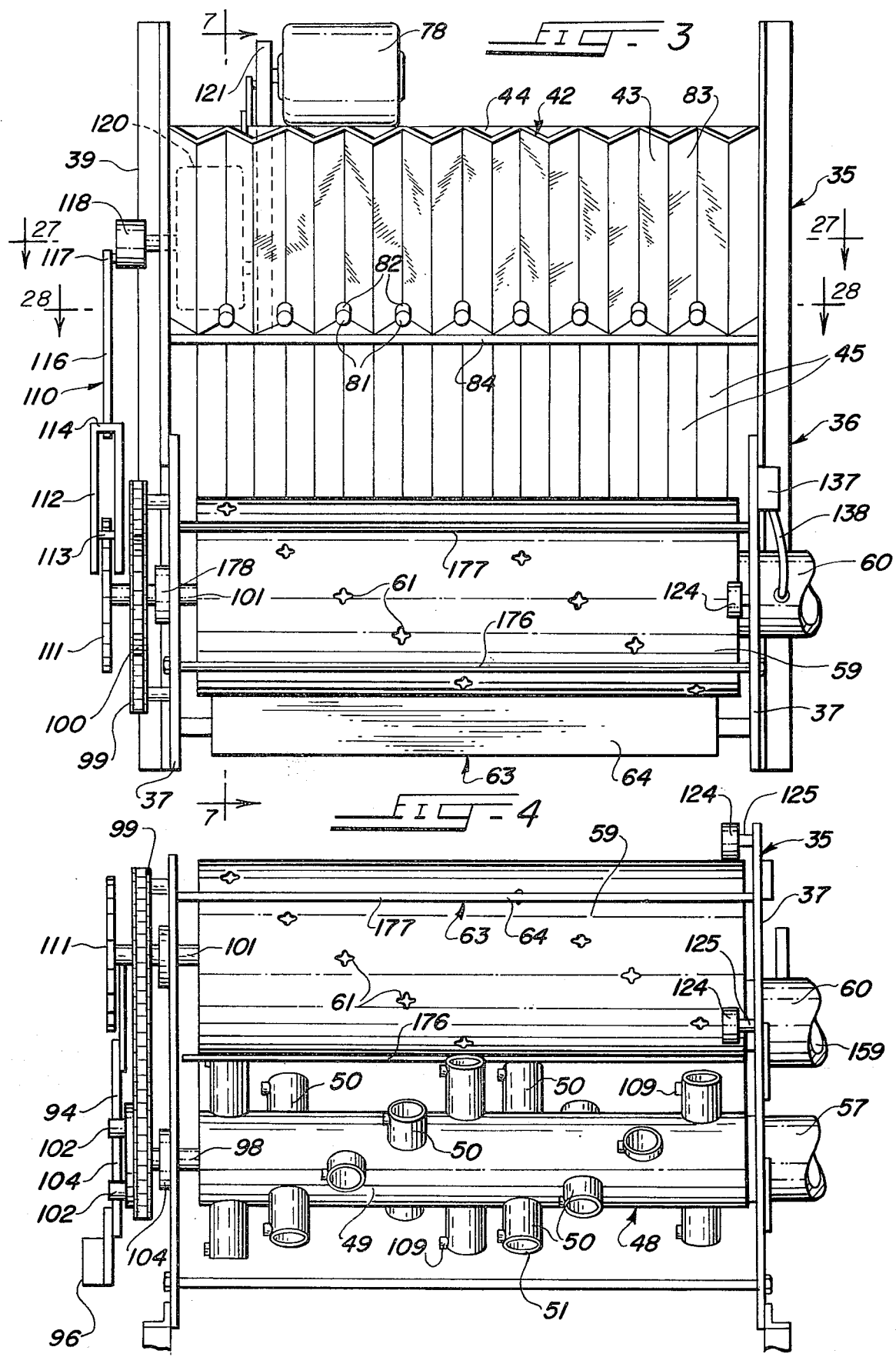

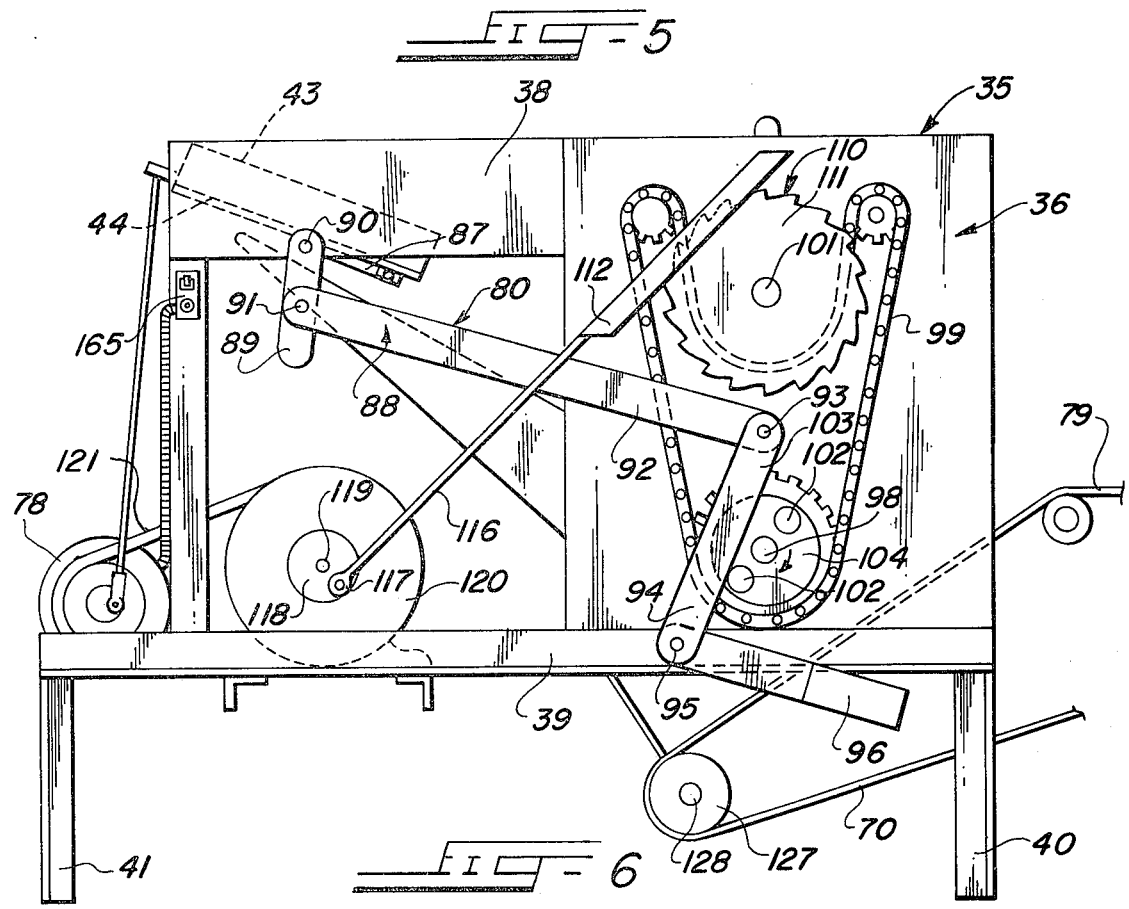
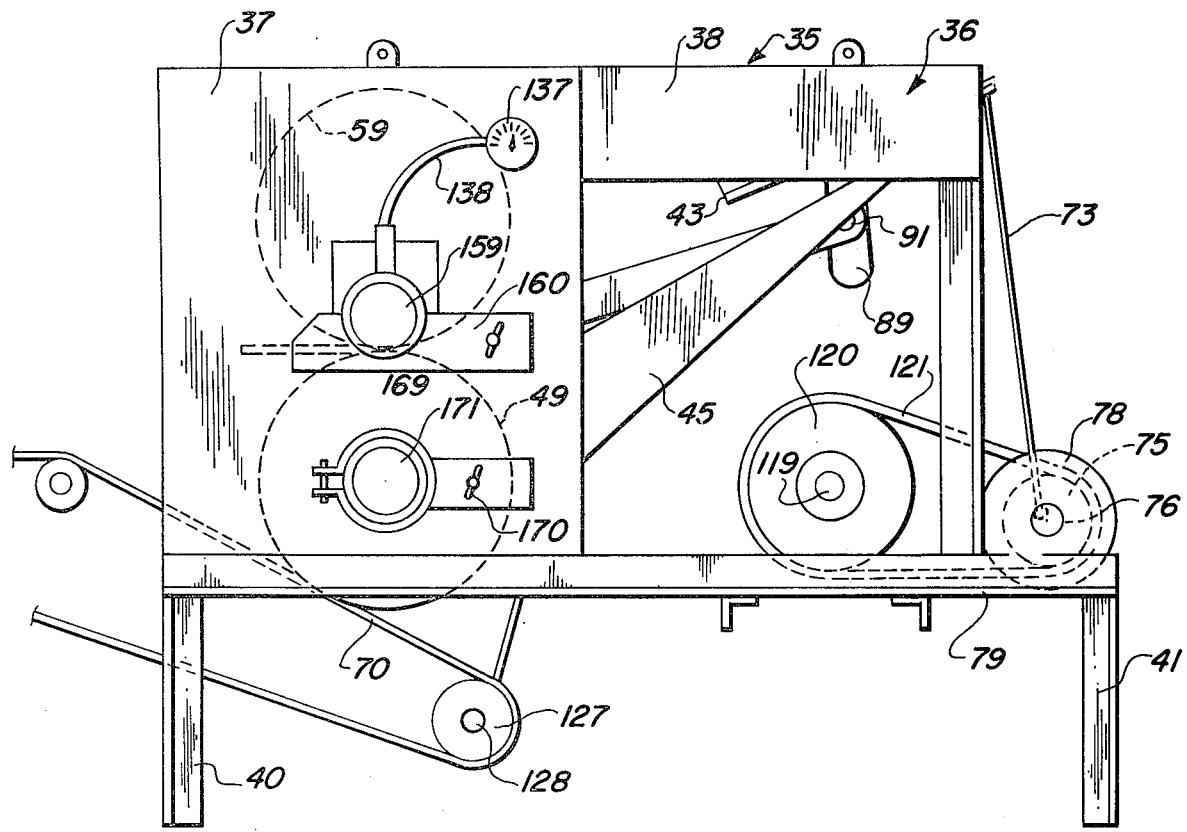

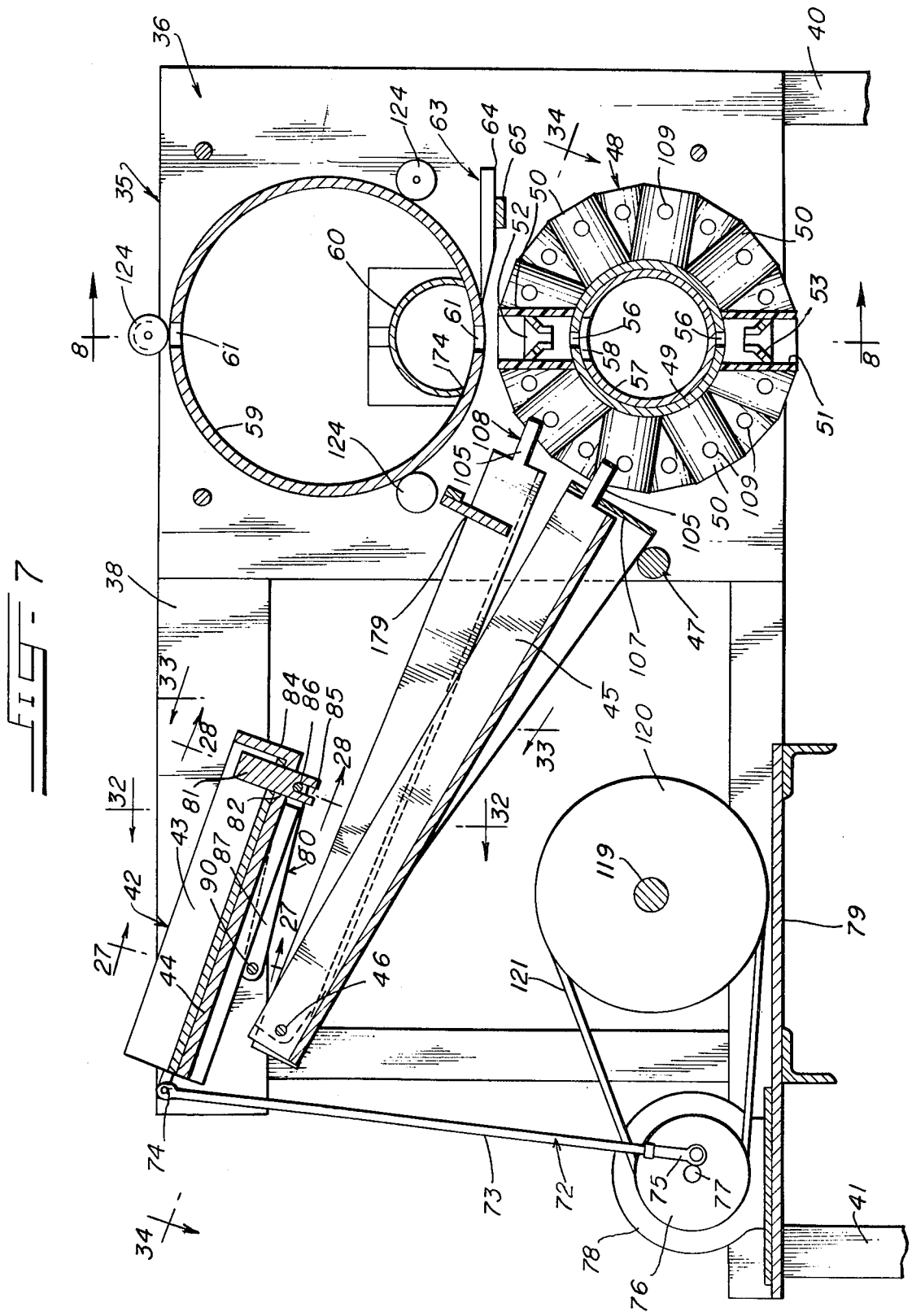

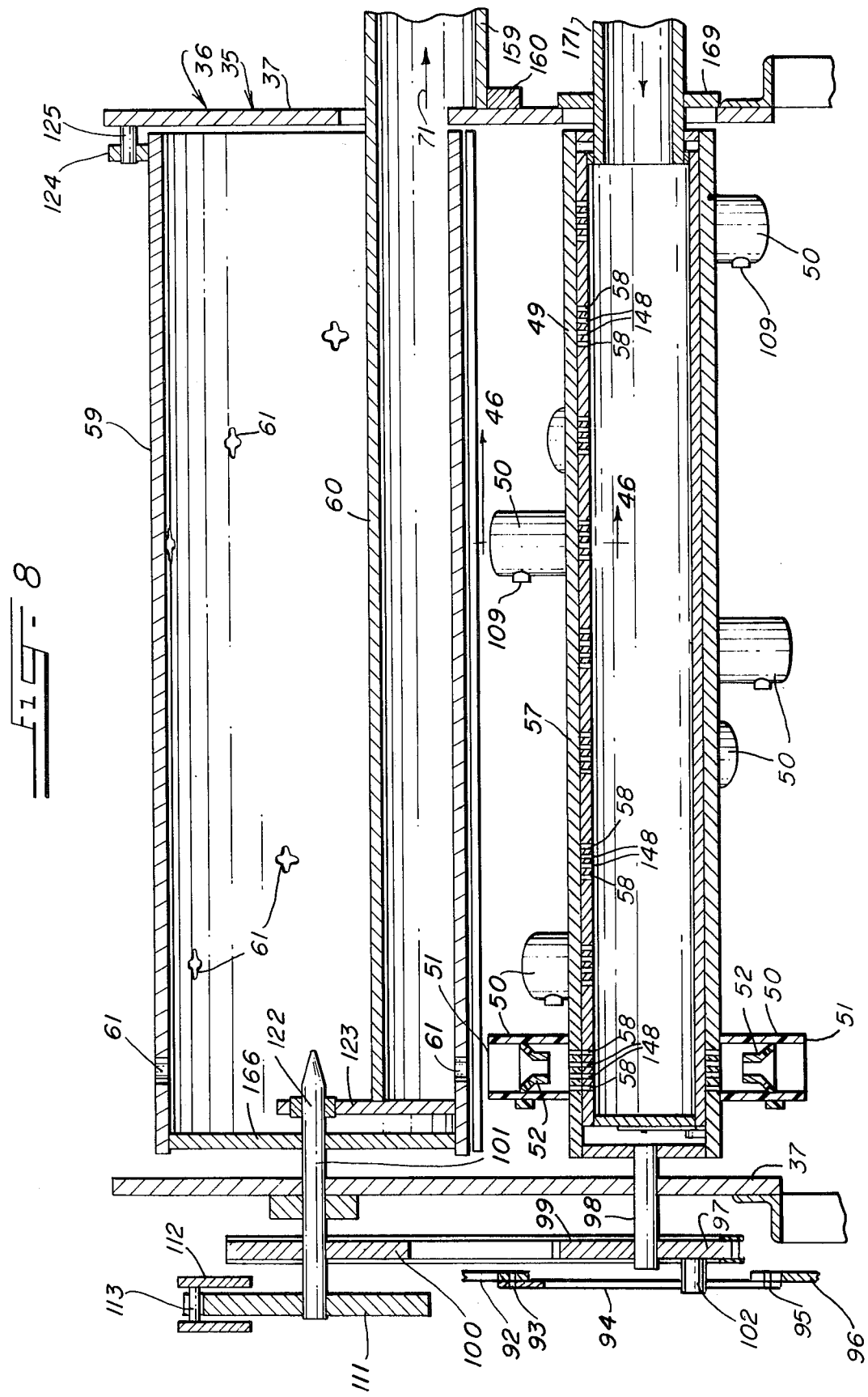

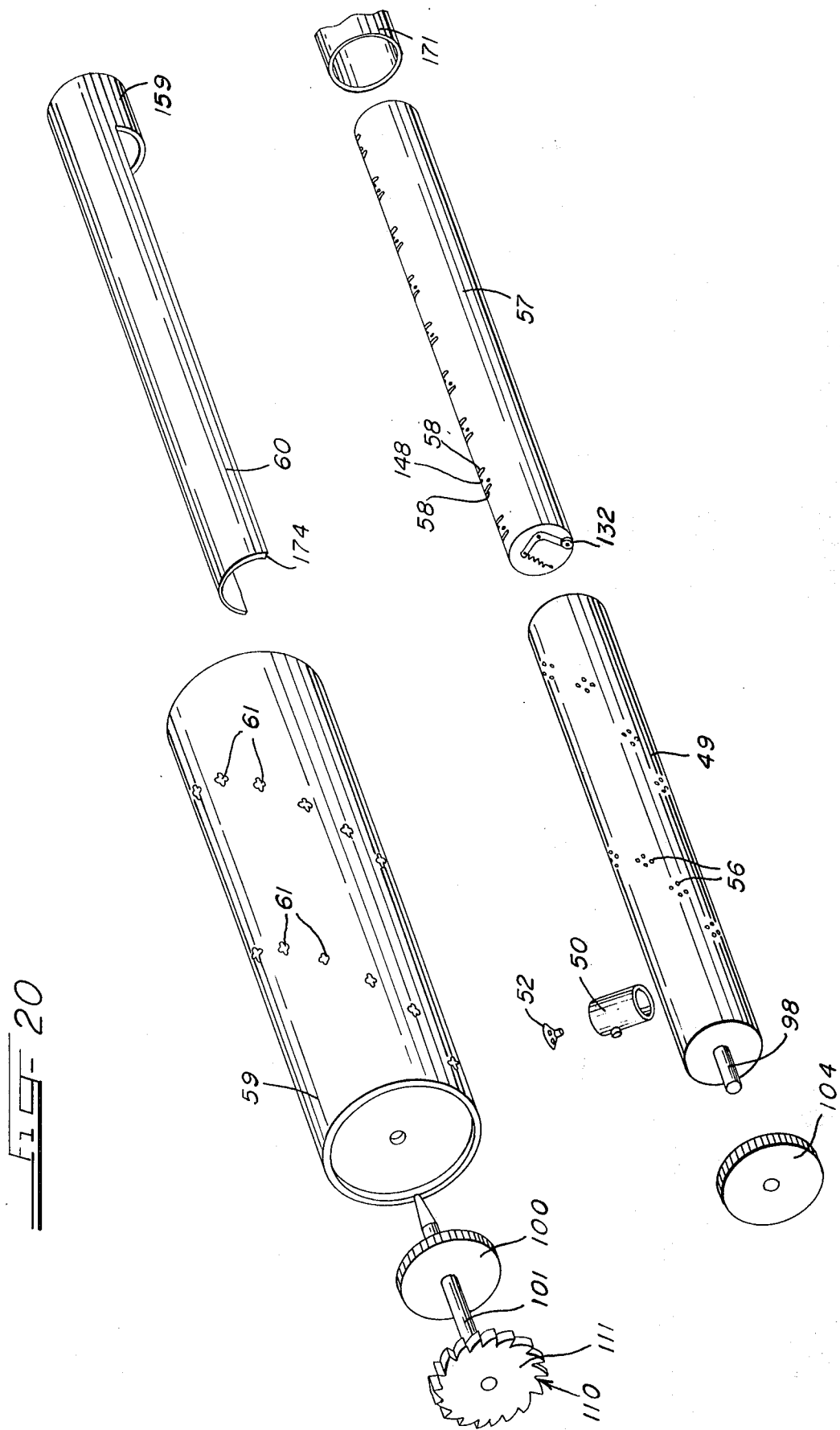

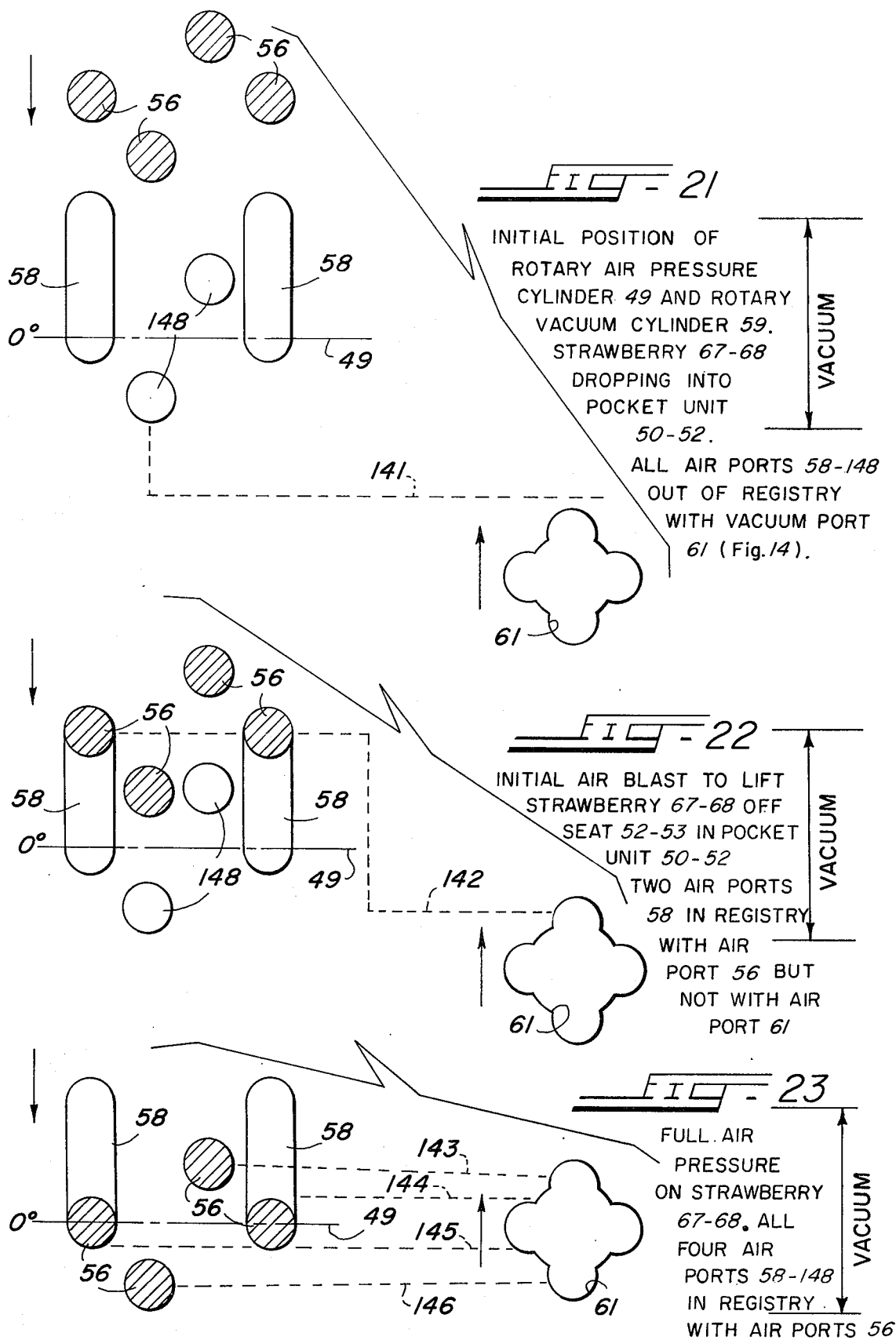

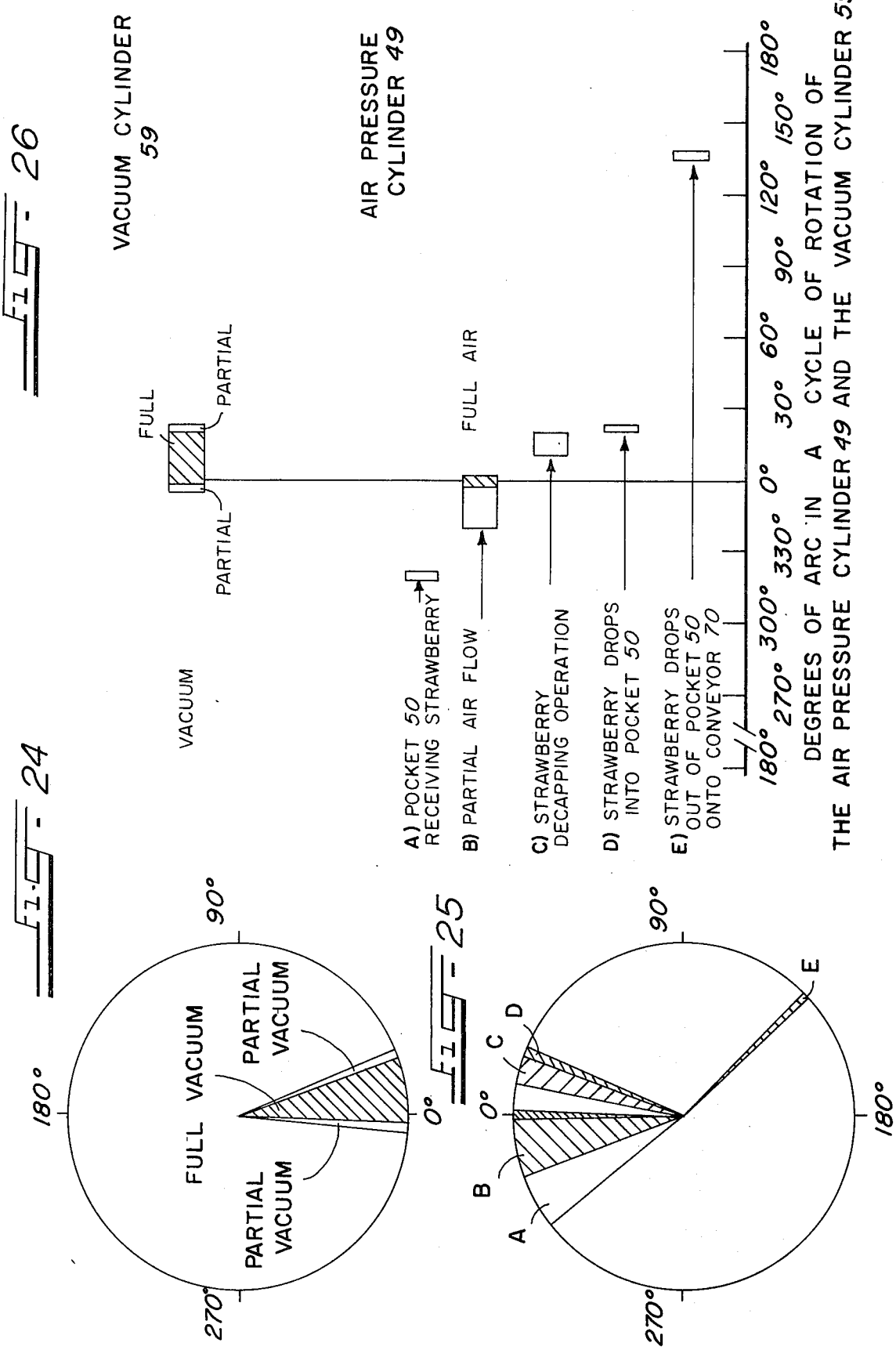

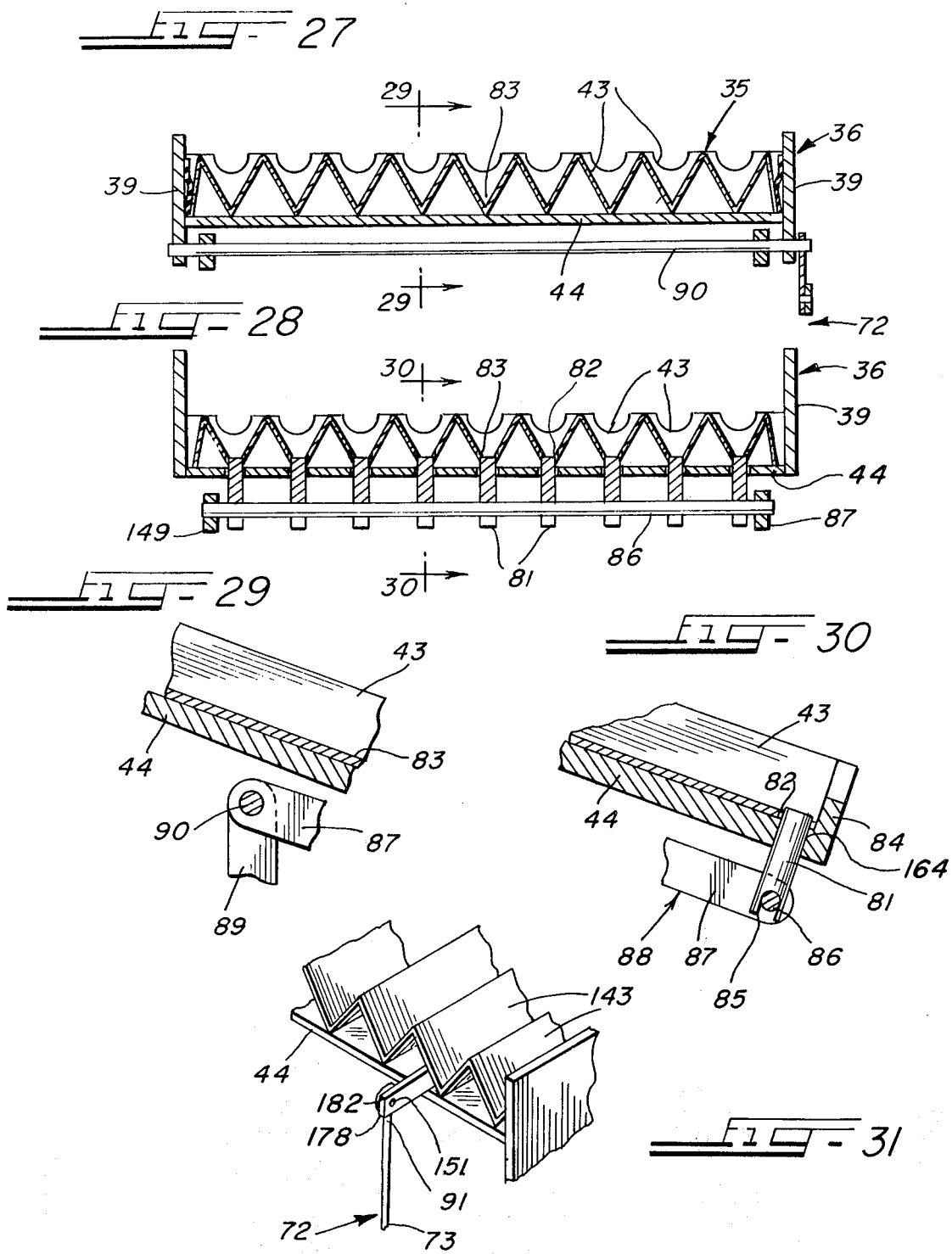

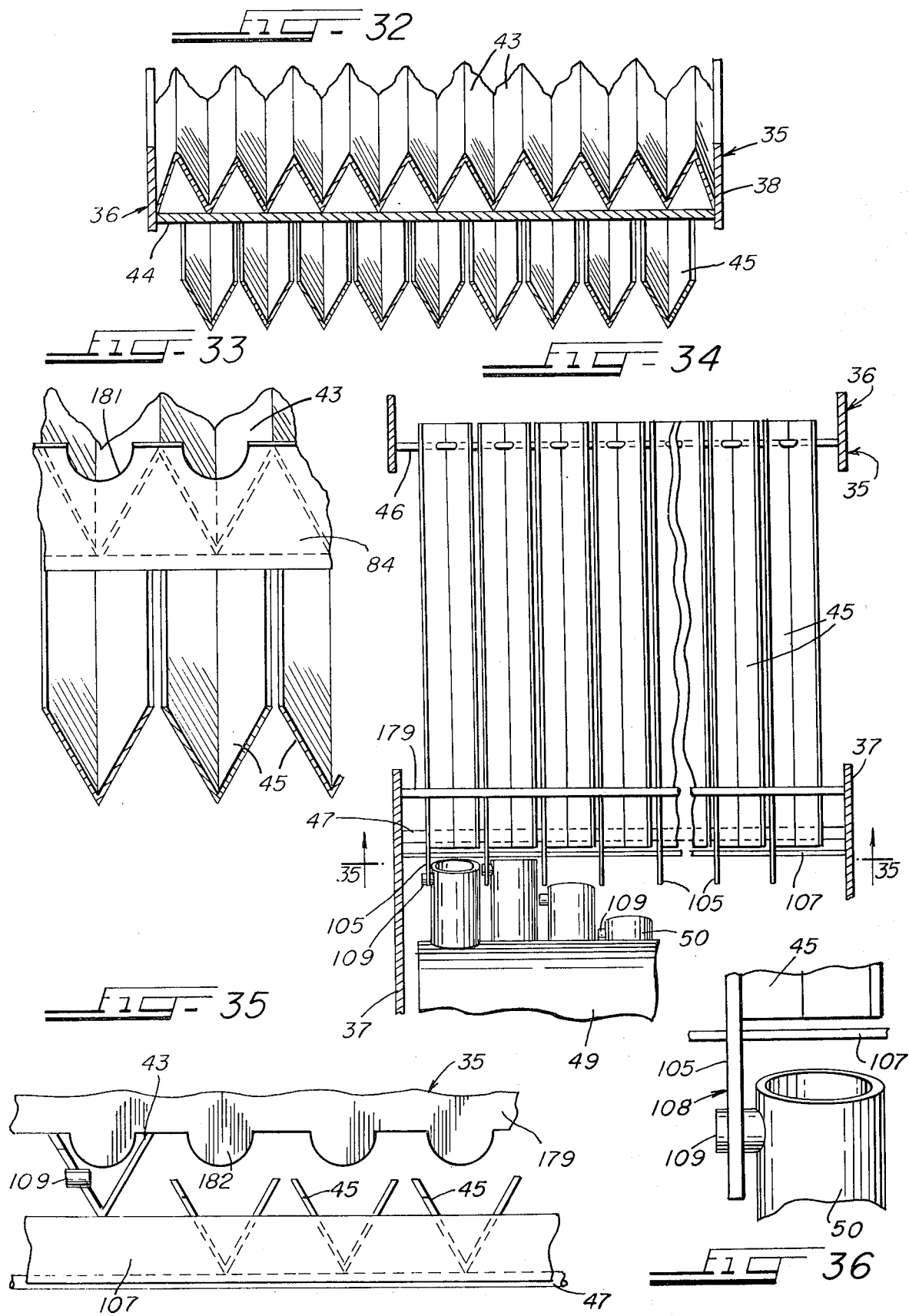

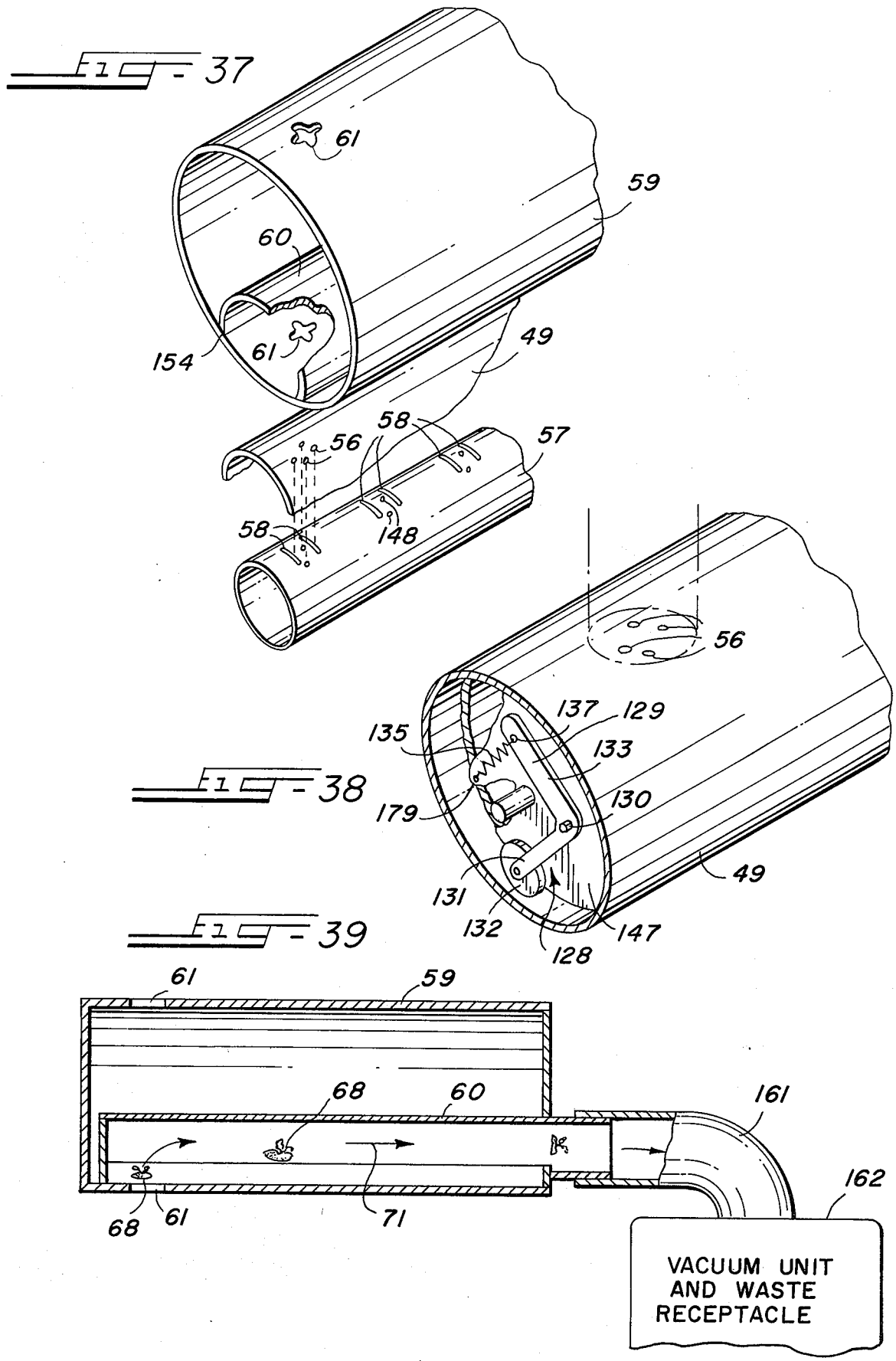

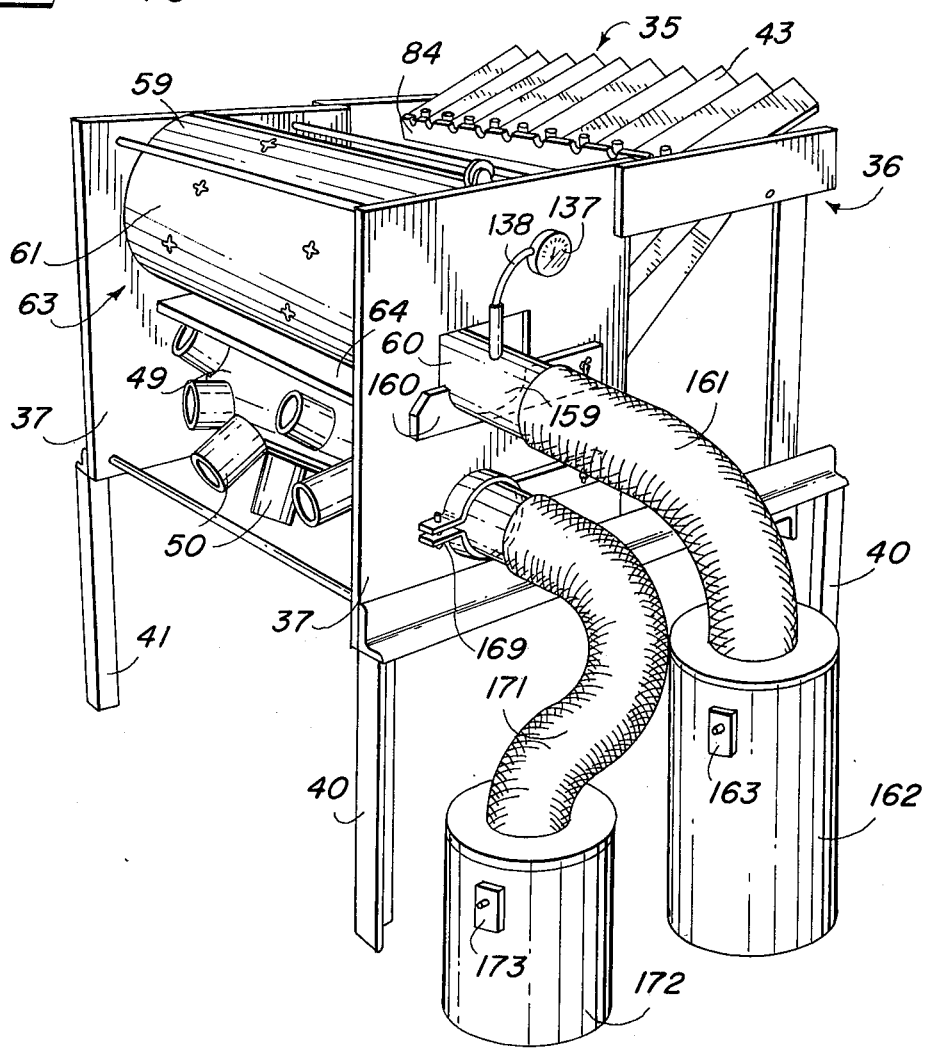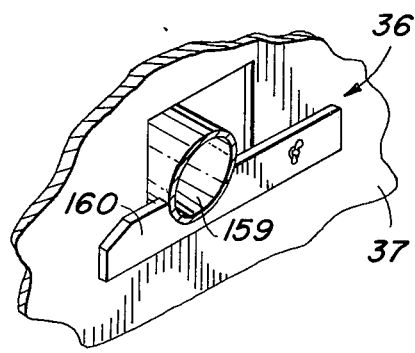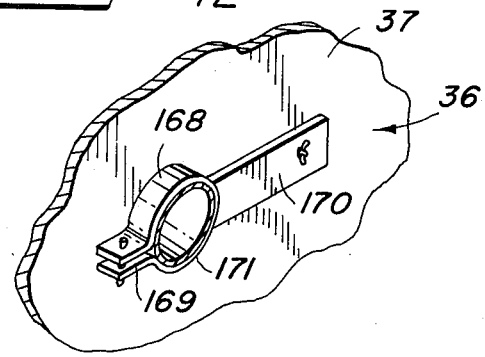

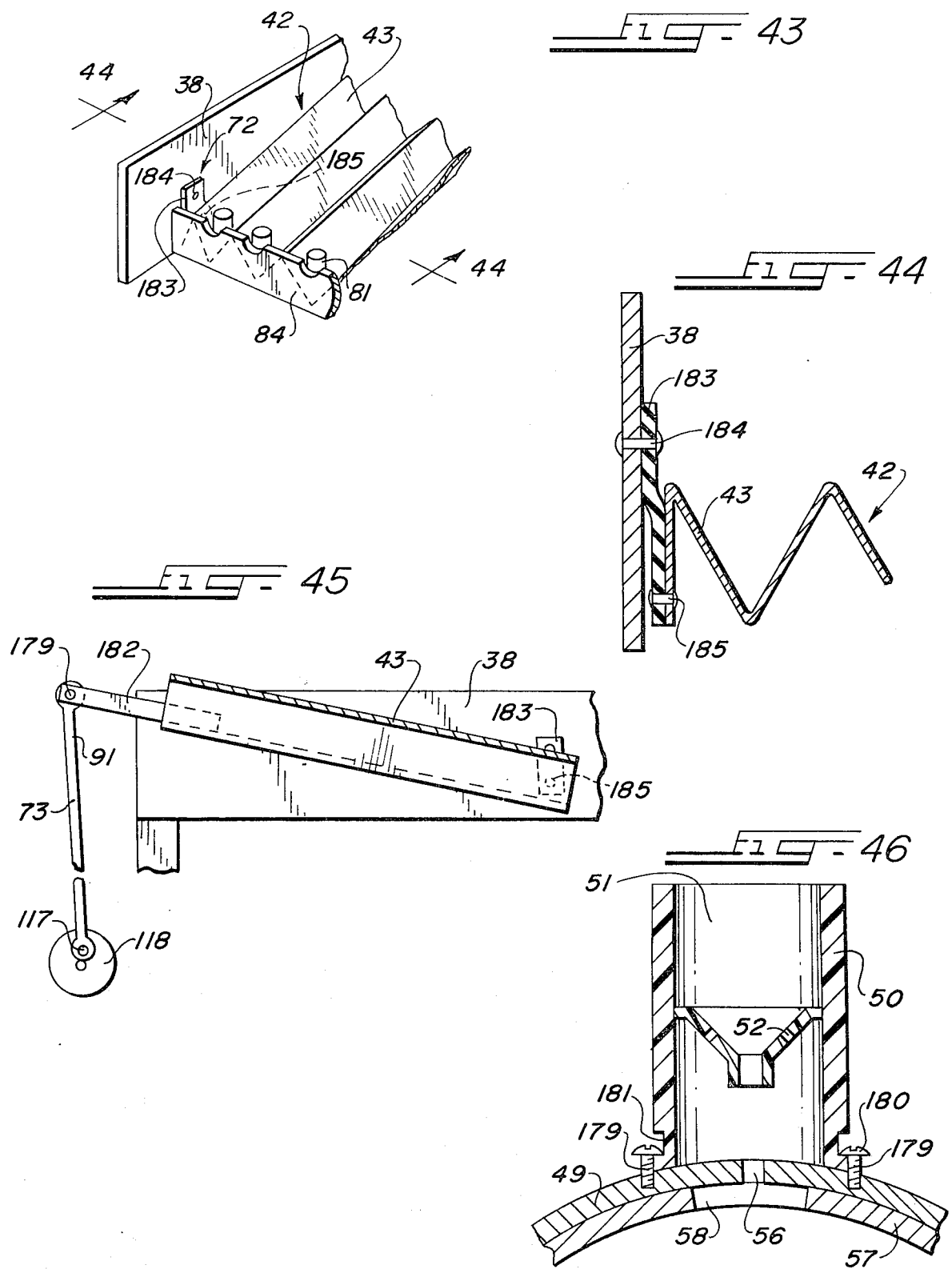

APPARATUS FOR DECAPPING THE STEMS OR CAPS OF STRAWBERRIES

BACKGROUND OF THE PRIOR ART

Various attempts have been made heretofore to provide a suitable apparatus for removing the caps or stems of strawberries but none of such devices have been, as far as applicant is aware, entirely satisfactory. The problem is important in the industry for the reasons that (1) the strawberry growing season is very short, lasting only a matter of several weeks, and (2) the supply of manual labor for this purpose has become increasingly short and the cost thereof prohibitive.

OBJECTS OF THE INVENTION

An object of the present invention is to provide a new and improved apparatus for rapidly and automatically decapping or removing the caps or stems of strawberries.

Another object of the invention is to provide a new and improved apparatus for rapidly and automatically decapping or removing the caps or stems of strawberries without damaging the bodies of the strawberries.

Another object of the invention is to provide a new and improved apparatus for automatically decapping the caps or stems of strawberries which may be readily operated by an unskilled operator.

A further object of the invention is to provide a new and improved apparatus for automatically decapping the caps or stems of strawberries and which is so designed and constructed that the parts thereof which come into contact with the strawberries may readily be disassembled for the purpose of maintaining the parts in clean and sanitary condition, as well as for the purpose of repair and replacement of parts.

Another object of the invention is to provide a novel combination of positioning or orienting and conveying means for properly positioning or orienting the strawberries with their caps or stems disposed in proper position to be cut or severed from the bodies of the strawberries during the decapping operation and for conveying the properly positioned or oriented strawberries into engagement with the decapping means.

An additional object of the invention is to provide novel means for disposing of the caps or stems of the strawberries after the decapping operation.

Still another object of the invention is to provide novel means under the control of the strawberry-positioning or orienting and conveying means for discharging the strawberries sequentially from the strawberry-feeding means into the strawberry-positioning or orienting and conveying means.

Other objects of the invention are (a) to provide a new and improved strawberry decapping apparatus for automatically and rapidly decapping the caps or stems of strawberries which includes a novel combination of an upper row of strawberry-receiving troughs and a lower row of strawberry-feeding troughs; (b) a rotary air pressure cylinder having strawberry-positioning or orienting and conveying pocket units arranged in staggered relationship axially and circumferentially on its outer peripheral surface and to which air under pressure is supplied from a stationary air pressure cylinder arranged within the rotary air pressure cylinder; (c) a rotary vacuum cylinder operating in timed relationship with the rotary air pressure cylinder and the strawberry-positioning or orienting and conveying pocket units thereon and having a series of vacuum ports formed in the wall thereof and arranged in staggered relationship axially and circumferentially relative to its outer or peripheral surface to which vacuum is applied from a stationary vacuum chamber arranged within the rotary vacuum cylinder; and (d) means under the control of the rotary air pressure cylinder and the strawberry-positioning or orienting and conveying pocket units thereon for discharging the strawberries sequentially and one at a time from each of the lower row of strawberry-feeding troughs into the strawberry-positioning or orienting and conveying pocket units on the rotary air pressure cylinder, as the latter is rotated, whereupon the strawberries are lifted radially outwardly from strawberry seats in the strawberry-positioning or orienting and conveying pocket units by the combined action of air pressure from below and vacuum from above so that they are properly positioned with the cap or stem of the strawberry disposed in one of the vacuum ports in the rotary vacuum cylinder in which it is held as the strawberry is rotated, by the combined action of the rotary air pressure cylinder and the rotary vacuum cylinder, into engagement with the decapping or knife means by which the cap or stem is decapped or severed from the body of the strawberry vacuum chamber from which it is discharged into a combination vacuum and waste disposal tank for disposal while the decapped strawberry is deposited onto a takeaway conveyor for removal and use.

Other objects will appear hereinafter.

DESCRIPTION OF FIGURES IN THE DRAWINGS

FIG. 1 is a perspective view illustrating a typical and preferred embodiment of the invention;

FIG. 2 is a rear elevational view of the apparatus shown in FIG. 1;

FIG. 3 is a top plan view of the apparatus shown in FIGS. 1 and 2;

FIG. 4 is a front elevational view of the apparatus shown in FIGS. 1, 2 and 3;

FIG. 5 is a side elevational view of the apparatus shown in FIGS. 1 to 4, inclusive, as seen from the left hand side in FIG. 1;

FIG. 6 is a side elevational view of the apparatus shown in FIGS. 1 to 5, inclusive, as seen from the right hand side in FIG. 1;

FIG. 7 is a view on line 7—7 in FIG. 3, partly in section and partly in elevation;

FIG. 8 is an enlarged vertical sectional view on line 8—8 in FIG. 7;

Figure 12:
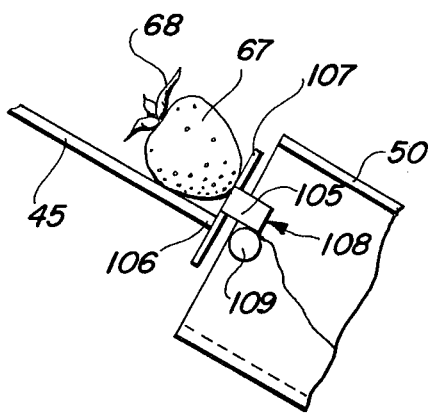
Figure 13:
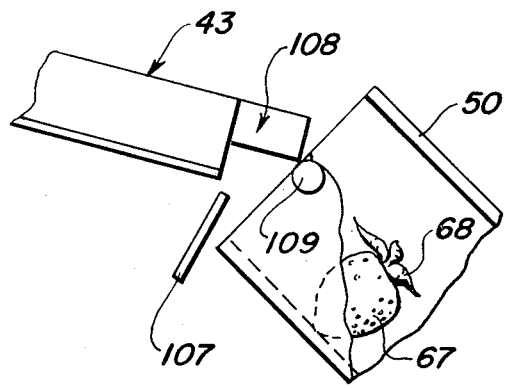
Figure 14:
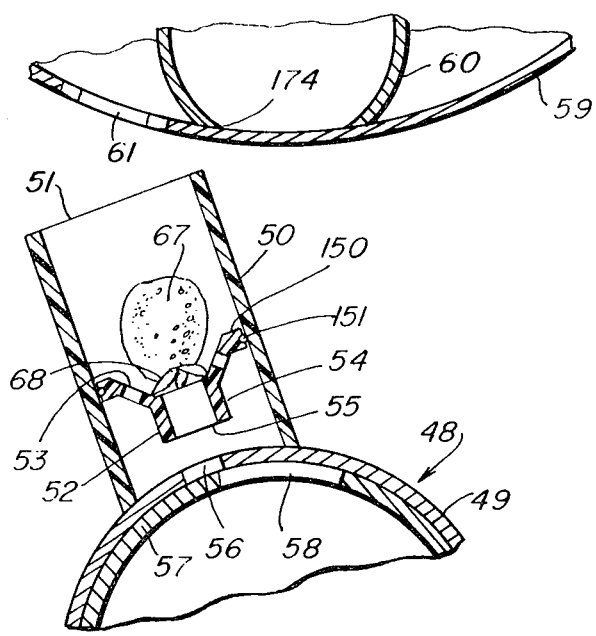
Figure 15:
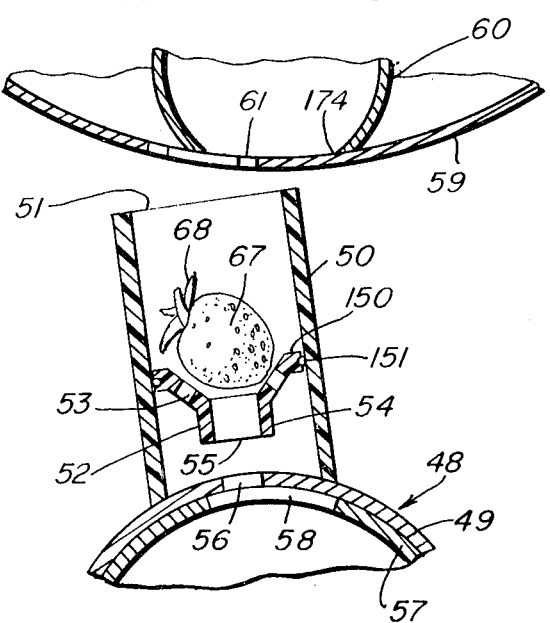
Figure 16:
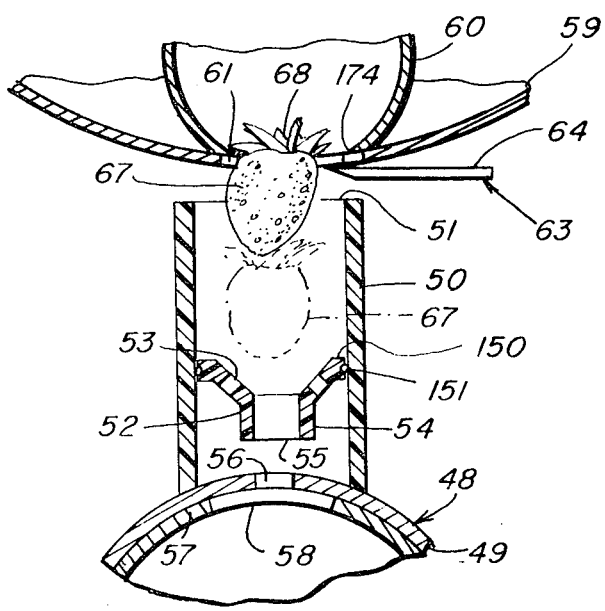
Figure 17:
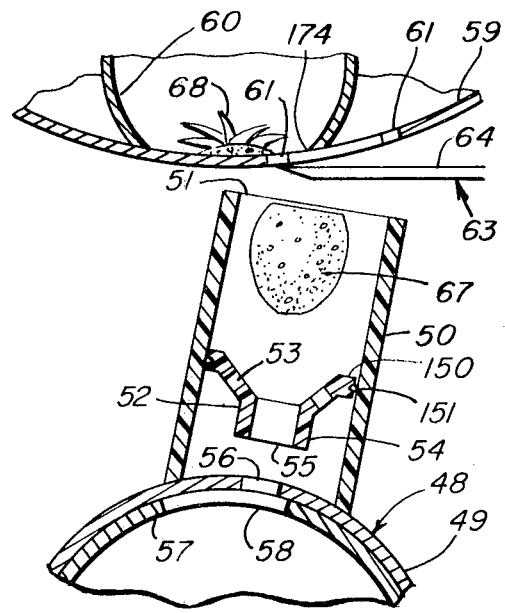
Figure 19:
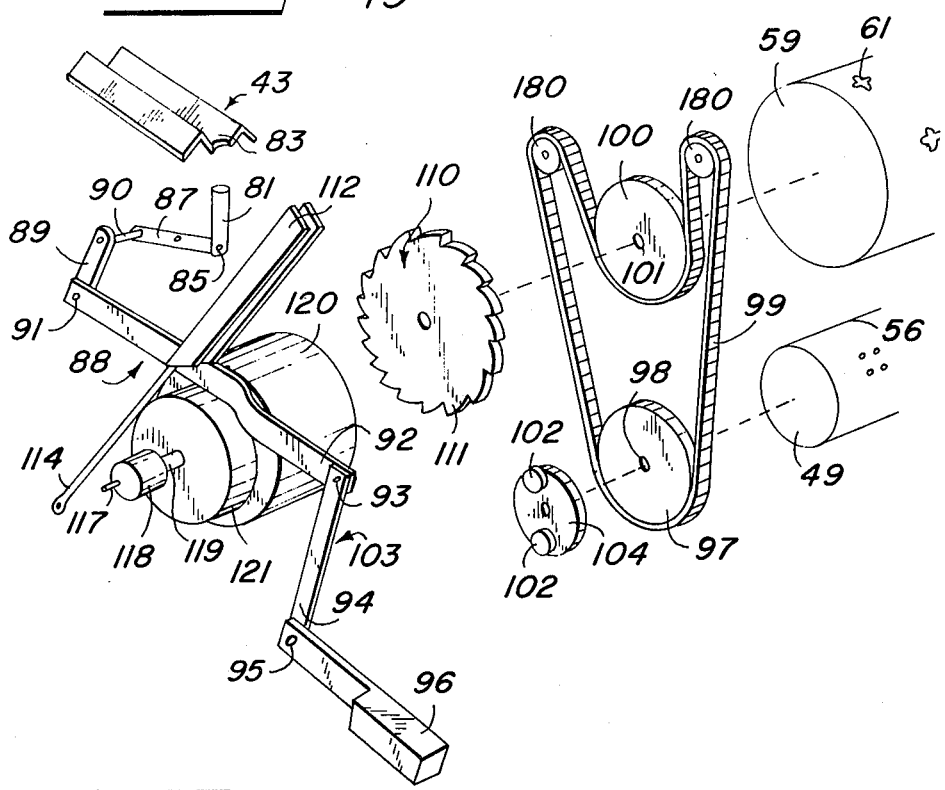
Figure 18:
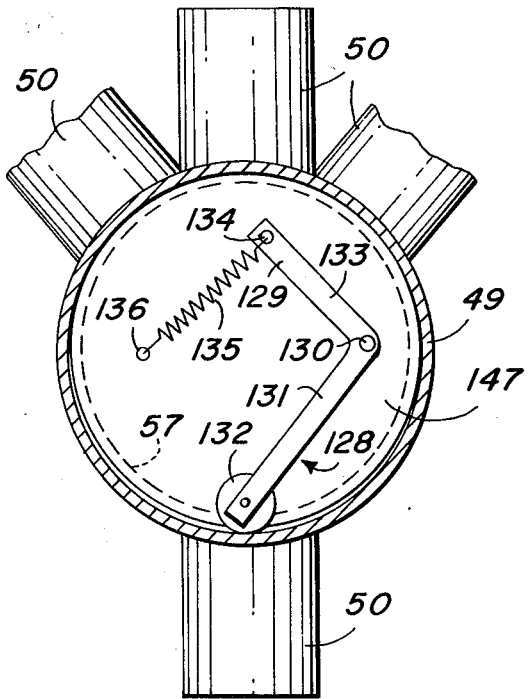

FIG. 12 is a fragmentary detail view of the gate or stop means by which the strawberries are held on the lower and stationary strawberry-feeding troughs prior to delivery into the strawberry-positioning or orienting and conveying pocket units of the rotary air pressure cylinder and also illustrating the cam means on the strawberry-positioning or orienting and conveying pocket units on the rotary air pressure cylinder for sequentially engaging and pivotally moving each of the pivotally mounted lower and strawberry-feeding troughs so as to lift the strawberry over the gate or stop means and drop it into one of the strawberry-positioning or orienting and conveying pocket units on the rotary air pressure cylinder;

FIG. 13 is a fragmentary detail view of the parts shown in FIG. 12 but showing the lower and strawberry-feeding trough in raised position and showing the strawberry deposited in one of the strawberry-positioning or orienting and conveying pocket units on the rotary air pressure cylinder;

FIG. 14 is a fragmentary sectional detail view showing a strawberry deposited on the strawberry-seat unit in one of the strawberry-positioning or orienting and conveying pocket units on the rotary air pressure cylinder in the first step at the start of the stawberry-positioning or orienting, conveying and decapping operations;

FIG. 15 is a fragmentary sectional detail view of the parts shown in FIG. 14 but showing the strawberry partially positioned or oriented in the second step of the strawberry-positioning or orienting, conveying and decapping operations;

FIG. 16 is a fragmentary sectional detail view of the parts shown in FIGS. 14 and 15 but showing the strawberry lifted off its seat and fully positioned or oriented by the combined action of air pressure from below and vacuum from above and ready to be moved into engagement with the decapping or knife means;

FIG. 17 is a fragmentary sectional detail view of the parts shown in FIGS. 14, 15 and 16 but showing the parts after the cap or stem has been cut or severed from the body of the strawberry and the body of the strawberry has been released from the vacuum port in the rotary vacuum cylinder and has dropped back into the strawberry-positioning or orienting and conveying pocket unit on the rotary air pressure cylinder and showing the decapped stem or cap of the strawberry being sucked or drawn into the stationary vacuum chamber and vacuum line for disposal;

FIG. 18 is a fragmentary elevational view illustrating means embodied in the invention for maintaining an air tight relationship between the stationary air pressure chamber and the rotary air pressure cylinder in which the stationary air pressure chamber is housed;

FIG. 19 is an exploded perspective view illustrating parts of the operating means for operating the movable parts of the new strawberry decapping apparatus in timed relationship with each other;

FIG. 20 is an exploded perspective view of the rotary air pressure cylinder and the stationary air pressure cylinder housed therein and also illustrating the rotary vacuum cylinder and the stationary vacuum chamber arranged therein and illustrating certain parts of the operating means therefor;

FIGS. 21, 22 and 23 are schematic views illustrating the sequential arrangement and relationship of the air pressure ports in the rotary air pressure cylinder and the vacuum ports in the rotary vacuum chamber during the strawberry-positioning or orienting, conveying and decapping operations;

FIG. 24 is a timing chart illustrating the relative timing required for various operations performed by the rotary vacuum cylinder in a typical cycle of operations thereof;

FIG. 25 is a timing chart illustrating the relative timing of the various operations performed by the rotary air pressure cylinder in a typical cycle of operations thereof;

FIG. 26 is a timing chart illustrating the relationship of the operations performed by the rotary vacuum cylinder to the operations performed by the rotary air pressure cylinder during a typical cycle of operations of these parts;

FIG. 27 is a sectional plan view on line 27—27 in FIG. 3 illustrating the upper and strawberry-receiving troughs and part of the vibrating meansn for vibrating the upper and strawberry-receiving troughs;

FIG. 28 is a sectional plan view on line 28—28 in FIG. 3 illustrating the lower and strawberry-feeding troughs and the strawberry-ejecting pin members for ejecting the strawberries from the upper and strawberry-receiving troughs;

FIG. 29 is a sectional detail view on line 29—29 in FIG. 27 illustrating one of the upper strawberry-receiving troughs and part of the vibrating means therefor;

FIG. 30 is a sectional detail view on line 30—30 in FIG. 28 illustrating one of the lower and strawberry-receiving troughs and one of the strawberry-ejecting pin members for ejecting the strawberries from the lower and strawberry-receiving troughs;

FIG. 31 is a fragmentary perspective view of the upper and strawberry-receiving troughs and part of the vibrating means therefor;

FIG. 32 is a sectional view on line 32—32 in FIG. 7 further illustrating the upper and strawberry-receiving troughs and the lower or strawberry-feeding troughs;

FIG. 33 is a sectional view on line 33—33 in FIG. 7 further illustrating the lower and strawberry-feeding troughs;

FIG. 34 is a view on line 34—34 in FIG. 7, partly in section and partly in elevation, illustrating parts of the lower strawberry-feeding troughs and the rotary air pressure cylinder and the strawberry-positioning or orienting and conveying pocket units mounted thereon;

FIG. 35 is a detail view on line 35—35 in FIG. 34, partly in section and partly in elevation;

FIG. 36 is a fragmentary detail view illustrating one of the strawberry-positioning or orienting and conveying pocket units on the rotary air pressure cylinder and the cam member mounted thereon for engagement with a cam finger member on one of the lower strawberry-feeding troughs for pivoting the latter into position to discharge the strawberry from one of the strawberry-feeding troughs into one of the strawberry-positioning or orienting and conveying pocket units on the rotary air pressure cylinder;

FIG. 37 is a fragmentary perspective view illustrating the shape and arrangement of the vacuum ports in the rotary vacuum cylinder and in the stationary vacuum chamber and illustrating the shape and arrangement of the air pressure ports in the rotary air pressure cylinder and in the stationary air pressure chamber;

FIG. 38 is a fragmentary perspective view of the rotary air pressure cylinder and parts of the stationary air pressure chamber;

FIG. 39 is a sectional view illustrating the rotary vacuum cylinder and the stationary vacuum chamber therein and illustrating the manner in which the strawberry caps or stems are drawn through the upper and stationary vacuum chamber and exhausted therefrom for disposal;

FIG. 40 is a perspective view of the new strawberry decapping apparatus illustrating the air pressure supply source and the vacuum source and the connections of the same with the stationary air pressure chamber and the stationary vacuum chamber, respectively;

FIG. 41 is a fragmentary perspective detail view illustrating the mounting of one end portion of the stationary vacuum chamber in a wall of the supporting frame of the new strawberry decapping apparatus;

FIG. 42 is a fragmentary perspective view illustrating the mounting of one end portion of the stationary air pressure chamber and the attachment of the flexible air pressure supply hose thereto;

FIG. 43 is a fragmentary perspective view of the upper strawberry-receiving troughs and the means for vibrating the same and illustrating the area encircled in FIG. 40;

FIG. 44 is a fragmentary sectional detail view on line 44—44 in FIG. 5, of the parts shown in FIG. 43;

FIG. 45 is a fragmentary view, partly in section, on line 45—45 in FIG. 3, further illustrating the means for vibrating the upper strawberry-receiving troughs; and FIG. 46 is an enlarged sectional detail view, on line 46—46 in FIG. 8, illustrating the detachable mounting of the strawberry-positioning or orienting and conveying pocket units on the rotary air pressure cylinder.

1. GENERAL DESCRIPTION OF THE CONSTRUCTION OF THE NEW STRAWBERRY DECAPPING APPARATUS AS SHOWN IN THE DRAWINGS a. The Supporting Frame Structure A preferred embodiment of the new strawberry decapping apparatus is illustrated in the drawings, wherein it is generally indicated at 35, and comprises a portable supporting frame 36 which includes upright side walls or panel members 37–38, horizontal side rails 39, and front and rear supporting legs 40 and 41, respectively, cross braces 176 and 177 (FIGS. 3 and 4), and other parts which will be referred to hereinafter.

b. The Upper Strawberry-Receiving Means or Strawberry-Receiving Troughs (FIGS. 1, 5, 7, 9, 10 and 17)

The new strawberry decapping apparatus includes strawberry-receiving means in the form of an upper row of strawberry-receiving troughs, generally indicated at 42, and which, in the embodiment shown in the drawings, is in the form of a row of a plurality (shown as nine) parallel and generally V-shaped troughs 43 which are rigidly interconnected together as a unit and are loosely supported by and upon a generally rectangular-shaped flat supporting base or member 44 which extends transversely across the supporting frame 36 at the rear thereof and between the upright side panels 38–39 to which it is attached in any suitable manner.

In the use of the new strawberry decapping apparatus strawberries are fed manually or otherewise into the upper end portions of the upper strawberry-receiving troughs 43. The supporting member 44 is inclined downwardly from its upper end to its lower end so that the upper strawberry-receiving troughs 43 are similarly inclined downwardly from their upper and rear ends to their lower and front ends (FIGS. 1, 5, 7, 9, 10 and 17) to facilitate the downward movement of the strawberries from the upper end portions of the troughs 43 to the lower end portions thereof, as will be described more fully hereinafter.

A horizontally extending wall member 84 extends transversely across the lower ends of all of the upper troughs 43 and is rigidly mounted in the supporting frame 36, and has spaced arcuate recesses 181 formed therein each in alignment with the lower end portion of one of the strawberry-receiving troughs 43 (FIGS. 1, 27, 30 and 33).

c. The Strawberry-Feeding Means or Lower Strawberry-Feeding Troughs (FIGS. 2, 3, 7, 10, 12, 13, 32, 33, 34 and 35)

As shown in FIGS. 2, 3, 7, 10, 12, 13, 32, 33, 34 and 35, the new strawberry decapping apparatus includes strawberry-feeding means in the form of a lower row of a plurality (shown as nine) V-shaped parallel strawberry-feeding troughs 45 which are disposed below and extend generally parallel to the upper strawberry-receiving troughs 43. The lower row of strawberry-feeding troughs 45 extend across the supporting frame 36 between the upright side panels 38—39 and are separately and pivotally mounted on the supporting frame 36, and are adapted to receive the strawberries from the upper strawberry-receiving troughs 43, as will be described hereinafter.

As shown in FIGS. 2 and 7 of the drawings, the upper end portion of each of the lower strawberry-feeding troughs 45 is pivotally mounted on a rod-like shaft member 46 which extends through suitable openings in the upper end portions of the lower strawberry-feeding troughs 45 and has its end portions suitably mounted in the upright side panels 38–39 of the supporting frame 36 (FIG. 2). The lower end portions of the lower and strawberry-feeding troughs 45 are supported in their lower or at rest position upon a resilient rod-like rubber or like resilient bumper member 47 which extends horizontally across the supporting frame 36 below the lower end portions of the lower strawberry-feeding troughs 45 and is suitably mounted on the upright side panels 37 of the supporting frame 36 (FIG. 7).

d. The Strawberry-Positioning or Orienting and Conveying Means for Properly Positioning or Orienting the Strawberries Prior to the Decapping Operation and for Conveying Them Into Engagement with the Decapping Means (FIGS. 1, 2, 4, 7, 8, 14, 15, 16, 17 and 20)

The new strawberry decapping apparatus 35 includes means for properly positioning or orienting the strawberries prior to the decapping operation and for conveying them into engagement with the decapping or knife means. This positioning or orienting and conveying means is generally indicated at 48 and includes a rotary air pressure and carrier cylinder 49 which is rotatably mounted in a horizontal position in the supporting frame 35 below the lower ends of the lower strawberry-feeding troughs 45. The rotary air pressure and carrier cylinder 49 has mounted thereon a plurality (shown as eighteen in two helical rows of nine), of generally cylindrical strawberry-positioning or orienting and conveying or carrier pocket units 50 which are preferably made of transparent molded plastic resinous material and are detachably mounted on the outer peripheral surface of the wall of the rotary air pressure cylinder 49 by means of fastening elements in the form of screws 179, each having a head portion 180 which engages a stepped wall 181 on the inner surface of the pocket unit 50 (FIG. 46). The pocket units 50 project radially from and are disposed in staggered relationship axially and circumferentially in helical rows on the rotary air pressure cylinder 49; each of the strawberry-positioning or orienting and conveying pocket units 50 having an open radially outer end portion 51 (FIGS. 1, 2, 4, 7, 8, 14, 15, 16 and 17).

Each of the strawberry-positioning or orienting and conveying or carrier pocket units 50 has an inner seat member 52 which is preferably made of rubber or other flexible and resilient plastic resinous material and each of the seat members 52 is frictionally, adjustably and removably mounted in one of the pocket units 50 (FIGS. 7, 8, 14, 15, 16 and 17). Each of the strawberry seat members 52 has a generally frusto-conical shaped radially outer portion which provides a strawberry seat 53 and each of the strawberry seat members 52 has an annular flange portion 150 at its radially outer end and an annular plastic resinous ring member 151 is mounted in each of the annular flange portions 150 (FIGS. 14–17). Each of the strawberry seat members 52–53 has a radially inner neck or end portion 54 which has an open radially inner end 55 which communicates with a group of (four) air outlet ports 56 which are provided in the wall of the rotary air pressure cylinder 49 (FIGS. 14–17 and 20) to which the pocket units 50 are attached.

As is also shown in FIGS. 14–17, the new strawberry decapping apparatus 35 includes an inner and stationary air pressure cylinder 57 which is arranged within and "floats" within the rotary air pressure cylinder 49. The inner stationary air pressure cylinder 57 has a longitudinally extending row of air outlet ports 58-148-58 formed therein, these air outlet ports 58-148-58 being arranged in spaced groups or clusters (FIG. 20) which are adapted to register sequentially with the groups of air outlet ports 56 which are arranged in two spiral rows in the rotary air pressure cylinder 49 upon rotation of the rotary air pressure cylinder 49.

The means 48 for properly positioning or orienting the strawberries and for moving them into proper position prior to and for carrying out the decapping operation also includes vacuum means in the form of a rotary vacuum cylinder 59 which is rotatably mounted in the supporting frame 36 above the rotary air pressure cylinder 49 and has a stationary vacuum chamber 60 arranged therein. The stationary vacuum chamber 60 is generally hemispherical in form with the bottom wall thereof which opens as at 174 (FIGS. 14–17) into the interior of the surrounding rotary air pressure cylinder 59. The rotary vacuum cylinder 59 has a plurality (shown as eighteen) vacuum air ports 61 formed therein arranged in two spiral rows and which are adapted to be moved sequentially into engagement with the radially outer open end portions 51 of the pocket units 50 on the rotary vacuum cylinder 49 (FIGS. 7, 8 and 14–17, inclusive).

As best shown in FIGS. 14–17, each of the strawberry seat members 52-53-54-150-151 is frictionally held in position of use in the generally cylindrical body of the pocket units 50 by means of the flexible resilient plastic resinous ring member 151 which is mounted on the annular flange portion 150 thereof so that the strawberry seat members 50 may be adjustably positioned at a desired position in the generally cylindrical body of the pocket unit 50 and may be readily removed therefrom to facilitate cleaning the pocket units 50 and the strawberry seat members 52-53-54-150-151, as well as for the purpose of replacement and repair.

e. The Strawberry Decapping Means (FIGS. 7, 16 and 17)

The strawberry decapping means is generally indicated at 63 (FIGS. 7, 16 and 17) and is shown as being in the form of an elongated decapping knife 64 which is stationarily mounted on a supporting member 65 below the rotary vacuum cylinder 59 and above the rotary air pressure cylinder 49 and off center relative to the rotary vacuum cylinder 59 and the rotary air pressure cylinder 49 (FIGS. 7, 16 and 17).

f. The Endless Takeaway Conveyor (FIGS. 1 and 5)

f. The new strawberry decapping apparatus 35 includes an endless takeaway or delivery conveyor 70 which is movably mounted below the supporting frame 36 (FIGS. 1 and 5) and below the rotary air pressure cylinder 49 and below the strawberry-positioning or orienting and conveying pocket units 50-51 for receiving the bodies of the decapped strawberries from the rotary pocket units 50-51 after the decapping operation.

The endless takeaway conveyor 70 is mounted at its inner turnaround on a cylinder or roller 127 having a shaft 128 which is journaled in upright supporting standards 152 which may be mounted on the floor of a building or other supporting surface below the supporting frame 36, and the takeaway conveyor 70 works around suitable guide rollers as 153 and 154 (FIGS. 1 and 5). At its outer turnaround the endless conveyor 70 works around a cylinder or roller 155 which has a drive shaft 156 which is journaled in upright supporting standards 157 which may be mounted on the floor of a building or like supporting surface in which the new strawberry decapping apparatus 35 is housed, and the drive shaft 156 for the roller 155 may be driven in any suitable manner, as by means of an electrical motor 158 which is suitably mounted adjacent the roller 155 and is operatively connected to the drive shaft 156 of the roller 155 (FIG. 1).

g. The Strawberry Cap or Stem Disposal Means (FIGS. 3, 4, 8, 16, 17, 39, 40 and 41)

The strawberry vacuum chamber 60, in addition to providing a vacuum or suction for the purposes set forth above, also provides part of a disposal means for disposing of the caps or stems of the strawberries after they have been decapped from the bodies of the strawberries (FIGS. 3, 4, 8, 16, 17, 39, 40 and 41).

As shown in FIGS. 40 and 41, the stationary vacuum chamber 60 has an outer end portion 159 which is mounted on a supporting bracket 160 which is attached to one of the upright side walls or panel members 37 of the supporting frame 36. The outer end portion 159 of the stationary vacuum chamber 60 is connected by a flexible hose 161 to a vacuum tank 102 which houses suitable electrically operated vacuum or suction means (not shown) but which may be controlled by a manually operable switch 163 mounted on the vacuum tank 162 (FIG. 40).

The vacuum tank 162 serves both as a vacuum tank and as a waste disposal receptacle for the severed strawberry caps or stems 68.

2. GENERAL DESCRIPTION OF THE OPERATION OF THE NEW STRAWBERRY DECAPPING APPARATUS AS SHOWN IN THE DRAWINGS

The strawberries 67-68 may be fed manually, or in any other suitable manner, into the upper end portions of the upper row of downwardly inclined strawberry-receiving troughs 43 whereupon the strawberries will roll by gravity down to the lower end portions of the strawberry-receiving troughs 43 where they are held by the stationary bottom wall member 84-81 over which the strawberries are ejected by ejecting means, which will be described hereinafter. The strawberries then drop or fall by gravity into the lower downwardly inclined strawberry-feeding troughs 45 down which they roll by gravity and from which the strawberries are fed sequentially and one at a time into the open radially outer or upper end of one of the strawberry-positioning or orienting and conveying pocket units 50 which are mounted on the rotary air pressure cylinder 49, as the rotary air pressure cylinder 49 and attached strawberry-positioning or orienting and conveying pocket units 50 are rotated by power means and power transmission means which will be described hereinafter.

As the strawberries 67-68 are fed sequentially into the strawberry-positioning or orienting and conveying pocket units 50-51 on the rotary air pressure cylinder 49 they fall by gravity onto the frusto-conical seats 53 of the strawberry seat members 52 with the strawberries 67-68 positioned with their caps or stems 68 disposed in various random positions, such as downwardly, as in FIG. 14. However, as the rotary air pressure cylinder 49 and attached strawberry-positioning or orienting and conveying pocket units 50-51 are rotated, by suitable power means and power transmission means which will be described hereinafter, air under pressure (preferably in the order of about 1 pound) is supplied from the inner and stationary air pressure chamber 57 through the air outlet ports 58-148 therein, thence through the air outlet ports 56 in the rotary air pressure cylinder 49, into and radially outwardly through the radially inner air inlet ends 55 of the strawberry-positioning or orienting and conveying pocket units 50, through the seat members 52-53-54, and thence radially outwardly through the bodies of the generally cylindrical strawberry-positioning or orienting and conveying pocket units 52-53-54 (FIGS. 14–17).

As the rotary air pressure cylinder 49 and attached strawberry-positioning or orienting and conveying pocket units 51-52-53 are rotated (clockwise, FIGS. 14–17) the upper and rotary vacuum cylinder 59 is rotated sequentially therewith, in a step by step movement, and vacuum or suction is applied from the inner and stationary vacuum chamber 60 through the open lower end 174 thereof to the rotary vacuum cylinder 59 and thence by way of the vacuum ports 61 in the rotary vacuum cylinder 59 into the open upper ends 51 of the strawberry-positioning or orienting and conveying pocket units 50-52. At the same time, air under pressure is supplied from the air port holes 148 and air port slots 58 in the lower and stationary air pressure chamber 57 into the air port holes 56 in the rotary air pressure cylinder 49. This combined action of vacuum or suction from above and air under pressure from below on the strawberries 67-68 disposed in the strawberry seat members 52-53-54 lifts the strawberries 67-68 off the frusto-conical seats 52-53 up into the upper end portions of the strawberry-positioning or orienting and conveying pocket units 50-52 with the result that the strawberries 67 and attached stems or caps 68 are sequentially moved from their initial positions, in which the strawberry 67 and attached stem or cap 68 is shown in FIG. 14, into the position in which it is shown in FIG. 15, and thence into the final position in which it is shown in FIG. 16.

During this operation the strawberry 67-68 is turned from a position, as in FIG. 14, in which the cap or stem 68 of the strawberry is disposed, in a random position, as downwardly, into a position, as shown in FIG. 15, in which the cap or stem 68 of the strawberry extends laterally at one side of the body of the strawberry, into a position, as in FIG. 16, in which the cap or stem 68 of the strawberry is disposed upwardly or at the top of the body of the strawberry.

In this manner, the strawberry 67 and attached cap or stem 68 are forced radially outwardly in the strawberry-positioning or orienting and conveying pocket units 50-52 and off the strawberry seat members 52-53-54 and are properly positioned or oriented with respect to the decapping means or knife 64 as they are conveyed into decapping position with the cap or stem 68 disposed upwardly and with the body of the strawberry 67 held in position in the vacuum port 61 of the rotary vacuum cylinder 59 by which the strawberry 67-68 is carried to the decapping means or knife 64 which thereupon engages to cap or stem 68 and severs it from the body of the strawberry 67.

As the rotary air pressure cylinder 49 and attached strawberry-positioning or orienting and conveying pocket units 50-52 continue to rotate (clockwise, FIGS. 14–17) and the rotary vacuum cylinder 59 continues to rotate (counterclockwise, FIGS. 14–17) communication between the air pressure ports 56 in the rotary air pressure cylinder 49 and the vacuum ports 61 in the rotary vacuum cylinder 59 is cut off with the result that the body of the decapped strawberry 67 falls by gravity back into one of the strawberry-positioning or orienting and conveying pocket units 50-52 from which it is discharged by gravity onto the endless takeaway conveyor 70 (FIGS. 1 and 5) for removal and use.

At the same time the severed strawberry cap or stem 68, with perhaps a small part of the body of the strawberry 67-68 attached thereto, is sucked or drawn into the stationary vacuum chamber 60 through the vacuum port 61 therein, and is thence drawn through the vacuum chamber 60 from which it is discharged by way of the outer end portion 159 of the stationary vacuum chamber 60 and the flexible hose connection 161 into the vacuum tank 162 in the direction of the arrows 71 (FIGS. 8, 39, 40 and 41) from which the caps or stems 68 of the strawberries may be removed for disposal, thereby completing a cycle of operation of the new strawberry decapping apparatus 35.

It will be noted that in the use of the new strawberry decapping apparatus 35, each of the clusters or groups of air port holes 56 in each of the two rows thereof in the rotary air pressure cylinder 49, and the pocket units 50-52 in registration therewith are moved sequentially into registration with the air port holes 61 in the corresponding spiral row of air port holes in the rotary vacuum cylinder 59 before any of the groups or clusters of air port holes 56 in the second row thereof in the rotary air pressure cylinder 49 and the pocket units 50-52 in registration with the vacuum ports 61 in the rotary vacuum cylinder 59, so that the strawberries in each of the pocket units 50-52 in one spiral row thereof on the rotary air pressure cylinder 49 are decapped before any of the strawberries which are to be deposited in the second spiral row of pocket units 50-52 on the rotary air pressure cylinder 49 are moved into position to be decapped.

3. DETAILED DESCRIPTION OF CERTAIN PARTS OF THE NEW STRAWBERRY DECAPPING APPARATUS a. The Vibrating Means for Vibrating the Upper Row of Strawberry-Receiving Troughs 43 (FIGS. 6, 7, 27, 29, 31, 43, 44 and 45)

The new strawberry decapping apparatus 35 includes vibrating means, generally indicated at 72 (FIGS. 6, 7, 27, 29, 31, 43, 44 and 45) for vibrating the entire bank or row of upper strawberry-receiving troughs 43 on and relative to their supporting platform 44 so as to facilitate the downward movement of the strawberries therealong by gravity and to enable then to be fed into the lower strawberry-feeding troughs 45.

This vibrating means 72 includes a generally vertically extending eccentric vibrating rod 73 having an upper end portion 91 which is attached to a vibrating arm or rod 152 which extends transversely across the supporting member 44 below the row of upper strawberry-receiving troughs 43 (FIGS. 7, 31 and 45). The lower end portion of the eccentric vibrating rod 73 is eccentrically mounted, as at 75, only slightly off center, preferably in the order of 1/16 inch, on an eccentric cam or disc member 76 which is rotatably mounted on the shaft 77 of an electric driving motor 78 which is mounted on a horizontal supporting member 79 of the supporting frame 36 (FIGS. 6 and 7).

The means for vibrating the upper strawberry-receiving troughs 43 includes an arm 182 which has one end portion which is pivotally connected, as at 179, to the upper end portion 91 of the vibrating arm 73; the other end portion of the arm 182 being attached to one side of one of the upper strawberry-receiving troughs 43 (FIGS. 31 and 45).

The means for vibrating the upper strawberry-receiving troughs 43 also includes a pair of rubber or like resilient members 183, which are generally rectangular in shape, and each of which has an upper end portion which is pivotally attached, as at 184, to a wall as 38 of the supporting frame 36 adjacent the lower end of the upper strawberry-receiving troughs 43; one of the resilient members 179 being mounted at each side of the bank of upper strawberry-receiving troughs 43 (FIG. 43). The lower end portions of each of the resilient members 183 is pivotally connected, as at 185, to a side wall of one of the upper strawberry-receiving troughs 43 (FIGS. 43, 44 and 45).

The construction and arrangement of the vibrating means 72 for the row of upper strawberry-receiving troughs 43 is such that when the driving motor 78 is operated its shaft 77 is rotated and the shaft 77 in turn rotates the eccentric cam or disc 76 which, in turn, acts through the eccentric pin 77 to operate the eccentric vibratory rod 73 which, in turn, acts through the pivotal connection 179, the arm 178 (FIGS. 7, 31 and 45) to vibrate the entire bank or row of interconnected upper strawberry-receiving troughs 43 on the rubber or like resilient members 179 and their pivotal mountings 180 and 181, and relative to their support 44, thus facilitating the downward movement of the strawberries in the upper strawberry-receiving troughs 43.

b. The Strawberry Ejecting Means 80 for Ejecting The Strawberries from the Lower End Portions Of the Upper Strawberry-Receiving Troughs 43 And the Operating Means Therefor (FIGS. 5, 7, 10, 11, 19, 27, 29 and 30)

The new strawberry decapping apparatus 35 includes strawberry ejecting means, generally indicated at 80, for ejecting the strawberries from the lower end portions of each of the nine (9) upper strawberry-receiving troughs 43 so that the strawberries thus ejected will fall by gravity onto the lower and strawberry-feeding troughs 45. This strawberry ejecting means 80 is shown in FIGS. 5, 7, 10, 11, 19, 27, 29 and 30 and includes a row of strawberry ejecting pin members 81 each of which is slidably mounted for movement in a slot or opening 82 which is formed in the lower end portion of the bottom wall 83 of each of the upper strawberry-receiving trough members 43 adjacent the upright lower end wall 84 of the upper trough member 43. Each of the strawberry-ejecting pin members 81 is slidably mounted in an opening 164 which is formed in the supporting member 44 for the upper strawberry-receiving troughs 43 (FIGS. 28 and 30).

Each of the strawberry-ejecting pin members 81 has a slot 85 formed in the lower end portion thereof and each of these slots 85 opens at its lower end at the bottom of the strawberry-ejecting pin member 86 (FIGS. 7, 10, 11 and 30). All of the strawberry-ejecting pin members 81 for the upper row or bank of strawberry-receiving troughs 43 (shown as nine) are supported by and upon a transversely extending steel or like metal supporting and operating rod 86 which extends transversely across the new strawberry decapping apparatus 35 and through each of the slots 85 in the strawberry-ejecting pin members 81 (FIGS. 7, 10, 11, 28 and 30).

One end portion of the transversely extending supporting and operating rod member 86 for the strawberry-ejecting pin members 81 is pivotally connected to an operating link member 87 which forms parts of an operating means, generally indicated at 88 (FIGS. 1, 5, 19, 28 and 30), for the strawberry-ejecting pin members 81 and their supporting and operating rod member 86; the other end portion of the supporting and operating rod member 86 having a head or cap 149 thereon to hold it in position and against lateral sliding movement (FIG. 28).

The operating link member 87 of the operating means 88 for the strawberry-ejecting pin members 81 is pivotally connected, as at 90, to a link member 89 which, in turn, is pivotally connected between its ends, as at 91 (FIGS. 1 and 5), to the upper end portion of an elongated link member 92 which is arranged at one side of the supporting frame 36. The lower portion of this elongated link member 92 is pivotally connected, as at 93, to the upper end portion of an operating link member 94, the lower end portion of which is pivotally mounted, as at 95, on a horizontal supporting frame member 39 of the supporting frame 36. A counterweighted member 96 is pivotally mounted on the pivotal mounting 95 and is rigidly attached to the operating link member 94.

The operating means for the strawberry-ejecting means, including the strawberry-ejecting pin members 81, includes a sprocket gear 97 which is rotatably mounted on an outer end portion of a horizontal supporting shaft 98 for the rotary air pressure cylinder 49 (FIGS. 8 and 19). The sprocket gear 97 is driven by a sprocket chain 99 which engages and works around a sprocket gear 100 which is rotatably mounted on a horizontal supporting shaft 101 for the rotary vacuum cylinder 59 (FIGS. 5, 8 and 19); the shaft having one end portion which is journaled in a bearing 178 (FIG. 3).

A cam plate member 104 is mounted on the shaft 98 outwardly of the sprocket gear 97 and a pair of disclike cam members 102 are mounted on the cam plate 104 on the outer side thereof. These disc-like cam members 102 are spaced 180° apart (FIGS. 5 and 19) and are disposed in alignment or coplanar relationship with the edge portion 103 of the operating link member 94, for a reason which will be explained hereinafter (FIGS. 5 and 19).

c. Operation of the Strawberry Ejecting Means 80 For Ejecting the Strawberries from the Upper Troughs 43 (FIGS. 2, 3, 5, 7, 10, 11, 19, 28 and 30)

The operation of the strawberry ejecting means 80 for ejecting the strawberries from the lower end portions of the upper troughs 43 so that they will fall by gravity onto the corresponding lower stawberry-feeding trough 45 is shown in FIGS. 2, 3, 5, 7, 10, 11, 19, 28 and 30 and is as follows:

When the supporting shaft 98 for the air pressure cylinder 49 and attached strawberry-positioning or orienting and conveying pocket units 50-52-53-54 are rotated by the sprocket chain 99 (through power means which will be described hereinafter) the sprocket gear 97 and the cam plate member 104 are rotated (clockwise, FIGS. 1 and 5) and as they are rotated the cam members 102 on the cam plate member 104 sequentially engage (twice in each rotation of the sprocket gear 99) the marginal edge portion 103 of the operating link member 94, thereby causing the link member 94 to pivot at 95 (counterclockwise, FIGS. 1 and 5). This motion of the link member 94 acts, through the pivotal connection 93 with the link member 92 and the linkage 92-91-89-90-87, to pivot the operating link member 87 and the transversely extending supporting and operating rod member 86 for the strawberry ejecting pin members 81 downwardly or clockwise (FIGS. 5 and 30), thereby lowering the strawberry ejecting pin members 81 from their normal upwardly extended or at rest position, into their lowered position, as in FIGS. 10 and 30.

During this operation the operating link member 94 acts through its pivotal mounting 95 and its rigid connection at that point with the counterweight member 96 to pivot the counterweight member 96 at 95 upwardly (counterclockwise, FIGS. 1 and 5) into its raised position.

Figure 9:
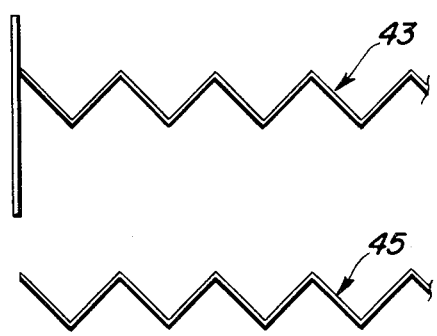
FIG. 9 is a fragmentary view of the first and upper row of strawberry-receiving troughs and the second and lower row of strawberry-feeding troughs by which the strawberries are fed to strawberry-positioning or orienting and conveying means by which the strawberries are fed sequentially to the decapping or knife means.
Figure 10:
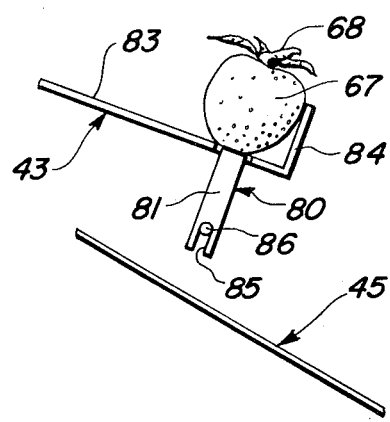
FIG. 10 is a fragmentary detail view of the strawberry ejecting means by which the strawberries are ejected sequentially from the first and upper row of strawberry-receiving troughs onto the second and lower row of strawberry-feeding troughs and showing the strawberry as it is positioned prior to its ejection from the upper strawberry-receiving trough.
Figure 11:
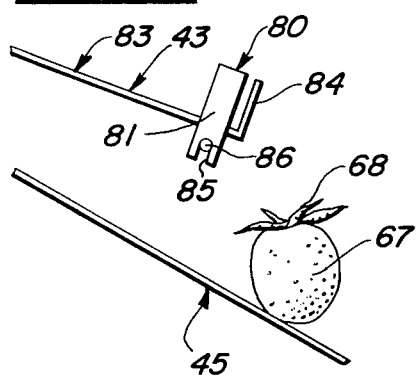
FIG. 11 is a fragmentary detail view of the strawberry ejecting means shown in FIG. 10 but showing the strawberry ejected from the first or upper strawberry-receiving trough and deposited onto the second and lower strawberry-feeding trough.

However, as the cam plate member 104 and the cam members 102 thereon continue to rotate (clockwise, FIGS. 1 and 5), and as each of the cam members 102 moves out of engagement with the edge portion 103 of the operating link member 94, the counterweight member 96 pivots downwardly by gravity on its pivotal mounting 95 and this motion of the counterweight member 96 acts, through the operating linkage 94-93-92-80-91-89-90-88-87, to pivot the operating member 87 and the operating rod member 88 from their lowered position, as in FIGS. 10, 28 and 30, into raised position, as in FIGS. 7 and 11. This action causes the strawberry ejecting pin members 81 to eject the strawberries 67-68 from the lower end portions of the upper and strawberry-receiving troughs 43 over the lower and upright end wall 84 of the upper and strawberry-receiving troughs 43, and through the notches or recesses 181 in the end wall 84, which facilitates the passage of the strawberries over the end wall 84. The thus ejected strawberries 67-68 then drop or fall by gravity onto the lower and strawberry-feeding trough members 45, as shown in FIG. 11. After each strawberry ejecting operation, the parts of the operating means 94-95-93-92-89-91-90-87 for the strawberry ejecting pin members 81 are returned in the next cycle of operations to their normal raised position, as in FIGS. 7 and 11.

In the operation of the new strawberry decapping apparatus, the use of the counterweight member 96 to effect the operation of lifting the strawberry ejecting pin members 81 and ejecting the strawberries from the upper and strawberry-receiving troughs 43, coupled with the power-driven operations of lowering the strawberry-ejecting pin members 81, creates a time lag in the strawberry-ejecting operation which affords adequate time for the strawberries to travel by gravity down the upper and strawberry-receiving troughs 43 onto the strawberry-ejecting pin members 81 prior to the time the strawberry-ejecting pin members 81 are raised to effect the strawberry-ejecting operation, as described above.

As shown in the drawings (FIGS. 5, 10, 11 and 30), the strawberry ejecting pin members 81 are removably mounted on their supporting and operating rod member 86 and may be readily removed therefrom by manually lifting them upwardly off the supporting and operating rod member 86, during which action the supporting and operating member 86, in effect, passes through the slots 85 which are formed in the lower end portions of the strawberry-ejecting pin members 81, thereby enabling the strawberry ejecting pin members 81 to be readily removed for cleaning and to enable them to be kept in a clean and sanitary condition, and for replacement and repair.

d. The Delivery or Auxiliary Feeding Means 108 For Delivering the Strawberries from the Lower Strawberry-Feeding Troughs 45 Into the Strawberry-Positioning, Orienting and Conveying Pocket Units 50-52-53 on the Rotary Air Pressure Cylinder 49 (FIGS. 7, 12, 13, 35 and 36)

The new strawberry decapping apparatus 35 includes delivery or auxiliary feeding means, generally indicated at 108 (FIGS. 7, 12, 13, 35 and 36), for delivering or feeding the strawberries 67-68 from the lower strawberry-feeding troughs 45 into the strawberry-positioning, orienting and conveying pocket units 50-52-53, a plurality of which (shown as two rows of nine each) are mounted on the outer peripheral surface of the rotary air pressure cylinder 49. This delivery or auxiliary feeding means 108 includes the pivotal mounting of the upper end portions of each of the lower strawberry-feeding troughs 45 on the horizontally extending supporting rod 46 for individual pivotal movement of the lower and strawberry-feeding troughs 45 relative to each other. The delivery or auxiliary feeding means 108 also includes a plurality of cam fingers or cam followers 105, one of which is mounted on and projects laterally from the lower end portion of each of the strawberry-feeding troughs 45 at the open lower end 106 of each lower strawberry-feeding trough 45 (FIGS. 7, 12, 13 and 36).

The strawberry delivery or auxiliary feeding means 108 includes a first gate or stop member 107 which is stationarily mounted in the supporting frame 36 at the mouths or open lower ends of the lower and strawberry-feeding troughs 45 (FIGS. 12, 13 and 36) and extends transversely across the supporting frame 36. The strawberry delivery or auxiliary feeding means 108 also includes a disc-like cam member 109 on each of the strawberry-positioning or orienting and conveying pocket units 50-52-53 (FIGS. 7, 12, 13, 35 and 36) and a cam follower or finger member 105 which is attached to and projects downwardly from the lower end portion of each of the lower troughs 45 (FIG. 7).

The strawberry delivery or auxiliary feeding means 108 includes a second and auxiliary gate or stop member 179 which is stationarily mounted in and extends transversely across the supporting frame above the first gate or stop member 107 (FIG. 7), the second or auxiliary gate or stop member 179 having a serrated or notched lower edge portion providing arcuate-shaped stop fingers 182 (FIG. 35), for a reason which will be pointed out presently.

In the use of new strawberry decapping apparatus 35, when the strawberries 67-68 are ejected from the upper strawberry-receiving troughs 43 and fall by gravity onto the lower strawberry-feeding troughs 45 they roll by gravity down the lower strawberry-feeding troughs 45 until they strike the first stationary gate or stop member 107 by which the strawberries 67-68 are held in position, as in FIGS. 7 and 12; the lower strawberry-feeding trough 45 then being disposed in its lowermost position, as shown in FIG. 7, with its lower end portion resting on the resilient support or bumper rod 47. However, when the air pressure cylinder 49 and attached strawberry-positioning, orienting and conveying pocket units 50-52-53 are rotated, in a manner which will be described more fully hereinafter (clockwise, FIGS. 7, 12 and 13), the cam members 109 on the strawberry-positioning, orienting and conveying pocket units 50-52-53 sequentially engage the projecting cam fingers or cam followers 105 on the lower end portions of the lower strawberry-feeding troughs 45 and thereby sequentially pivot the lower strawberry-feeding troughs 45 on their pivotal mounting 46 from the lowermost position in which one of the lower strawberry-feeding troughs 45 is shown in FIGS. 7 and 12, into the next or raised position in which it is shown in FIGS. 7 and 13. This action raises the lower and open end portion of the lower strawberry-feeding trough 45 above the stationary gate or stop member 107, thus causing the strawberry 67-68 to fall by gravity off the open lower end of the strawberry-feeding trough 45 into the then adjacent strawberry-positioning, orienting and conveying pocket units 50-52-53, as shown in FIG. 13.

As each of the lower and strawberry-feeding trough members is thus pivotally moved from its normal or lower and at rest position, as shown in FIG. 7, into a raised and strawberry-delivering operation, as also shown in FIGS. 7 and 13, and as it delivers a strawberry into one of the strawberry-positioning or orienting and conveying pocket units 50-51, it engages one of the arcuate-shaped stop fingers 182 on the second and auxiliary gate or stop member 179, which thereby prevents a second strawberry from being delivered from the lower trough member 45 into the same strawberry-positioning or orienting and conveying pocket unit 50-52 (FIG. 35).

Accordingly, as the strawberry-positioning, or orienting and conveying pocket unit 50-52 is further rotated (clockwise, FIGS. 7, 12, 13 and 14) the strawberry 67-68 therein drops into the frusto-conical seat 53 in the corresponding strawberry-positioning, orienting and conveying pocket units 52-53 with the stem or cap 68 of the strawberry 67-68 disposed in a random position, such as downwardly, relative to the body of the strawberry, as shown in FIG. 14, this being the initial position of the strawberry 67-68 as it is deposited in the strawberry-positioning, orienting and conveying pocket unit 50-52-53 to be decapped by the decapping means or knife 63-64, as will be explained hereinafter.

As the strawberries 67-68 are thus sequentially fed from the lower strawberry-feeding troughs 45 into the strawberry-positioning, orienting and conveying pocket units 50-52-53, each of the lower strawberry-feeding troughs 45 pivots downwardly, by gravity, on its pivotal mounting 46 until the lower end portion thereof engages the resilient stop member 47 by which the lower end portion of each of the lower strawberry-feeding troughs 45 is held in its normal or at rest position, as shown in FIG. 7.

It will be noted that the lower and strawberry-feeding troughs 45 are pivoted sequentially into raised and strawberry-feeding or discharging position by engagement of the cam members 109 on the strawberry-positioning or orienting and conveying pocket units 50-52 with the cam fingers 105 on the lower strawberry troughs 45 (FIG. 7), and that by reason of the staggered circumferentially and axially spaced relationship of the strawberry-positioning, orienting and conveying pocket units 50-52 on the outer or peripheral surface of the rotary air pressure cylinder 49 in the embodiment of the invention shown in the drawings, only one strawberry is fed or discharged at a time from one of the lower strawberry-feeding troughs 45 into one of the strawberry-positioning or orienting and conveying pocket units 50-52 for movement into engagement with the elongated decapping means or knife 63-64.

e. The Operating Means 110 for Sequentially Rotating The Air Pressure Cylinder 49 and the Strawberry-Positioning or Orienting and Conveying Pocket Units 50-52-53 Mounted Thereon in a Step by Step Movement And for Rotating the Vacuum Cylinder 59 in a Step By Step Movement and in Timed Relationship With The Discharge of the Strawberries from the Lower Strawberry-Feeding Troughs 45 (FIGS. 1, 2, 3, 4, 5, 19 and 20)

The new strawberry decapping apparatus 35 includes operating means, generally indicated at 110 (FIGS. 1, 2, 3, 4, 5, 19 and 20) for sequentially rotating the air pressure cylinder 49 and the strawberry-positioning, orienting and conveying pocket units 50-52-53 mounted thereon in a step by step movement, and for sequentially rotating the vacuum cylinder 59 in a step by step movement and in timed relationship with the step by step rotary movement of the air pressure cylinder 49, and in timed relationship with the discharge of the strawberries 67-68 from the lower end portions of the lower and strawberry-feeding troughs 45.

This operating means is generally indicated at 110 (FIGS. 1, 2, 3, 4, 5, 19 and 20) and includes the sprocket gear 100 on the supporting shaft 101 for the rotary vacuum cylinder 59 and a ratchet 111 which is mounted on an outer end portion of the supporting shaft 101 for the rotary vacuum cylinder 59, and a bifurcated ratchet-advancing yoke member 112 which rides the peripheral surface of the ratchet 111 and has a pawl 113 mounted therein which is adapted to engage suquentially or in a step by step motion the teeth on the ratchet 111 (FIGS. 1, 2, 3, 5 and 19). The bifurcated yoke member 112 extends angularly upwardly and has a lower end portion 114 which is attached, as at 115, to an eccentric operating rod member 116, which is eccentrically connected, as at 117, to an eccentric disc or cam member 118 which is mounted on the drive shaft 119 of a speed-reducing gear unit 120 which is driven by the electric operating motor 78 by way of suitable power transmission means in the form of a belt and pulley drive mechanism 121 (FIGS. 1, 2, 3, 5, 7 and 19).

f. The Operation of the Means 110 for Sequentially Rotating the Rotary Air Pressure Cylinder 49 and The Strawberry-Positioning, Orienting and Conveying Pocket Units 50-52-53 Mounted Thereon in a Step By Step Movement and for Rotating the Rotary Vacuum Cylinder 59 in a Step by Step Movement in Timed Relationship with the Step by Step Rotary Movement Of the Rotary Air Pressure Cylinder 49 and the Discharge of the Strawberries from the Lower End Portions of the Lower Strawberry-Feeding Troughs 45

The operation of the means 110 for rotating the air pressure cylinder 49 and the strawberry-positioning, orienting and conveying pocket units 50-52 mounted thereon in a step by step movement and for rotating the rotary vacuum cylinder 59 in timed relationship with the rotary air pressure cylinder 49 and the strawberry-positioning, orienting and conveying pocket units 50-52 mounted thereon in timed relationship with the discharge of the strawberries 67-68 from the lower end portions of the lower and strawberry-feeding troughs 45, is as follows:

When the electric driving motor 78 is energized (by a manually operable switch control unit 165, FIG. 5) power is delivered by way of the belt and pulley unit 121 to the speed reducing gear unit 120 and to the eccentric cam plate or disc 118 on the operating shaft 119 for the speed reducing gear unit 120. This rotation of the eccentric cam plate or disc 118 acts, through the eccentric connection 117, the eccentrically mounted rod 116, the bifurcated yoke member 112 and the ratchet operating pawl 114 thereon, to advance the ratchet 111 on the supporting shaft 101 for the rotary vacuum cylinder 59 one step (counterclockwise, FIG. 5) through 20° of an arc of rotation due to the fact that in the preferred embodiment of the invention shown there are eighteen (18) teeth on the ratchet 111. This step by step rotary motion of the ratchet 111 acts, through the shaft 101, the sprocket gear 100 on the shaft 101, and the sprocket chain 99, to impart a similar step by step rotary motion to the sprocket gear 104 on the supporting shaft 98 for the rotary air pressure cylinder 49 and the strawberry-positioning, orienting and conveying pocket units 50-52 mounted thereon, thereby advancing the rotary air pressure cylinder 49 and the strawberry-positioning, orienting and conveying pocket units 50-52 thereon through 20° of arc which is equivalent to one-eighteenth (1/18) of a cycle of rotation of the rotary air pressure cylinder 49 and the eighteen (18) strawberry-positioning, orienting and conveying pocket units 50-52 mounted thereon. This step by step rotary motion of the rotary air pressure cylinder 49 and the strawberry-positioning or orienting and conveying pocket units 50-52 thereon, advance one of the strawberry-positioning or orienting and conveying pocket units 50-52 (which are arranged in staggered relationship circumferentially and axially and in two rows on the peripheral or outer surface of rotary air pressure cylinder 49) into registration with the lower end portion of one of the lower strawberry-feeding troughs 45.

As the supporting shaft 98 for the rotary air pressure cylinder 49 and the strawberry-positioning or orienting and conveying pocket units 50-52 thereon, and the sprocket gear 104, are rotated (counterclockwise, FIG. 5) the two cam members 102 on the sprocket gear 104 successively or sequentially engage the edge portion 103 of the link member 94, thereby pivoting the link member 94 (counterclockwise, FIG. 5) at 95. This pivotal motion of the link member 94 acts, through the pivotal connection 93, and the link member 92 of the operating mechanism 88, to pivot the link member 89, at 91, thereby causing the link member 89 to act, through the pivot 90, to pivot the operating link member 87 of the rod-like supporting member 86 for the strawberry ejecting pin members 81 (clockwise, FIG. 7). This action lowers the strawberry ejecting pin members 81 on their supporting rod 86 into their lowered position, as in FIGS. 10, 28 and 30 so that the strawberries traveling down the upper strawberry-receiving troughs 43 will fall onto the tops of the strawberry-ejecting pin members 81. However, continued operation of the apparatus acts, through the counterweight member 96 and the linkage 95-94-93-92-80-81-90-88-87 to raise the operating and supporting rod 86 for the pin members 81, thereby raising the strawberry-ejecting pin members 81 and thus ejecting the strawberries 67-68 from the lower end portions of the upper strawberry-receiving troughs 43 over the end walls 83 thereof and thereby causing the strawberries to fall by gravity onto the bottom troughs 45 along which they travel downwardly by gravity until they engage the stationary gate or stop member 107.

g. The Mounting of the Rotary Vacuum Cylinder 59 (FIGS. 7 and 8)

As shown in FIG. 8, one end wall 166 of the rotary vacuum cylinder 59 is mounted on an inner end portion 122 of a stub shaft 101 which is rotatably mounted on one of the upright supporting walls 37 of the supporting frame 36; the inner end portion 122 of the stub shaft 101 extending through and being rotatably mounted in an upright end wall 123 of the stationary vacuum chamber 60 FIG. 8).

The other end portion of the rotary vacuum chamber 59 is rotatably guided by and upon a group of three anti-friction rollers 124 which are rotatably mounted on stub shafts 125 which are mounted in one of the walls 37 of the supporting frame 36 and are spaced 120° apart thereon (FIGS. 7 and 8).

h. The Pressure Means 128 for Maintaining The Stationary Air Pressure Chamber 57 In Constant Airtight Engagement with the Internal Surface of the Rotary Air Pressure Cylinder 49 (FIGS. 18 and 38)

The new strawberry decapping apparatus 35 includes pressure means, generally indicated at 128 (FIGS. 18 and 38), for maintaining the relatively stationary but somewhat "floating" air pressure chamber 57 in constant airtight communication with the interior surface of the generally cylindrical rotary air pressure cylinder 49. This pressure means 128 includes an L-shaped or bell crank member 129 which is pivotally mounted, as at 130, on an end wall 147 of the stationary air pressure chamber 57 and the L-shaped or bell crank member 129 includes an arm 131 which carries a which rides 132 rides on the inner peripheral surface of the rotary air pressure cylinder 49. The other arm 133 of the L-shaped or bell member 129 has an end portion which is attached, as at 134, to a coil spring 135 and the other end portion of the coil spring 135 is attached, as at 136, to the end wall 147 of the stationary inner air pressure chamber 57.

The arrangement of the parts of the pressure means 128 shown in FIGS. 18 and 38, and as described above, is such that as the rotary outer air pressure cylinder 49 is rotated (clockwise, FIG. 38) the roller 132 rides the outer end portion of the inner peripheral surface of the rotary air pressure cylinder 49 and the L-shaped or bell member 129-131-133 and the roller 132 thereon are urged by the then tensioned spring 135 in a direction (clockwise, FIGS. 18 and 38) to urge the "floating" stationary air pressure chamber 57 into constant airtight angagement with the inner peripheral surface of the rotary air pressure cylinder 49, thereby maintaining a constant airtight relationship between the stationary air pressure chamber 57 and the rotary air pressure cylinder 49, while at the same time, making allowance for wear due to friction on these parts in use.

i. The Air Pressure Supply for the Stationary Air Pressure Chamber 57 and the Rotary Air Pressure Cylinder 49 (FIGS. 40 and 42)

It will be noted (FIGS. 40 and 42) that one outer end portion 167 of the stationary air pressure chamber 57 projects through an opening 168 in one end wall 37 of the supporting frame 36 and is held in position by an adjustable clamping collar unit 169 which is attached to the end wall 37, as at 170. As shown in FIG. 40, the outer end portion 167 of the stationary air pressure chamber 57 is connected by a flexible hose connection 171 to an air pressure tank 172 which includes suitably electrically operated air pressure means (not shown) but which is controlled by a manually operable control switch 173 which is attached to the wall of the air pressure tank 172.

j. The Relationship of the Slotted Air Ports 58 And the Hole-Like Air Ports 148 in the Inner And Stationary Air Pressure Chamber 57 and the Hole-Like Air Ports 56 in the Outer Rotary Air Pressure Cylinder 49 to the Vacuum Ports 61 in The Rotary Vacuum Cylinder 60 and Their Relationship To the Strawberry-Positioning or Orienting and Conveying Pocket Units 50-58 (FIGS. 20, 21-23)

It will be noted (FIGS. 20, 21 and 23) that the air ports in the upper wall of the stationary pressure chamber 57 have two forms and are arranged in groups or clusters which are spaced axially along the center of the top wall of the stationary air pressure chamber 57. Each of the groups or clusters of air ports in the top wall of the stationary air pressure chamber 57 consists of two (2) air ports in the form of elongated and parallel slots 58 which extend circumferentially on the top wall of the stationary air pressure chamber 57 and each of such groups or clusters of air ports also includes two air ports in the form of circular air ports holes 148.

The air ports 56 in the rotary air pressure cylinder 49 are also arranged in groups or clusters which extend circumferentially and axially on and around the wall of the rotary air pressure cylinder 49, and each group or cluster of these air ports consists of four (4) circular air port holes 56 with each group or cluster of these circular air port holes 56 being disposed in permanent communication with the radially inner and open end portion of one of the strawberry-positioning or orienting and conveying pocket units 50 (FIGS. 14–17) each of which is rigidly mounted on the outer surface of the wall of the rotary air pressure cylinder 49 in registration with the one group or cluster of circular air port holes 56.

The air ports 61 in the rotary vacuum cylinder 59 are shown as being generally star-shaped in form and extend in rows circumferentially and axially of the rotary vacuum cylinder 59 (FIG. 20).

However, as indicated above, there are no vacuum ports in the generally hemispherical stationary vacuum chamber 60 which communicates by way of its open lower hemispherical portion 174 with the interior of the rotary cylindrical vacuum chamber 59.

The relationship of the slotted air ports 58 and the hole-like air ports 148 in the stationary air pressure chamber 57 and the hole-like air ports 56 in the rotary air pressure cylinder 49 to the vacuum ports 61 in the rotary vacuum cylinder 60 to the strawberry-positioning or orienting and conveying pocket units 50-52-53 on the rotary air pressure cylinder 49, as shown in FIGS. 14-17, inclusive, is shown schematically in FIGS. 21-23, inclusive, of the drawings, which will now be described.

Thus the relative positions of the four (4) hole-like air ports 56 in each group or cluster thereof, in the rotary air pressure cylinder 49, to the two (2) slotted air ports 58 and the two (2) hole-like air ports 148 in each group or cluster thereof in the stationary air pressure chamber 57, and the relationship of these air ports 56-58-148 to the vacuum ports 61 in the upper and rotary vacuum cylinder 59, is shown schematically in FIG. 21. Thus, FIG. 21 represents the relative positions of the parts, including the strawberry-positioning or orienting and conveying pocket units 50-52 on the rotary air pressure cylinder 49 to the upper and rotary vacuum chamber 59, as the parts are shown in FIG. 14, and from which it will be seen that the strawberry 67-68 has dropped into the strawberry-positioning or orienting and conveying pocket unit 50-52 but that all of the air pressure ports 56, in a group or cluster thereof in the rotary air pressure cylinder 49, and the two slotted air ports 58 and the two circular air port holes 148 in a corresponding group or cluster thereof in the stationary air chamber 57 are out of registry with the corresponding vacuum port 61 in the rotary vacuum cylinder 57 as indicated by the dotted lines 141 in FIG. 21, so that when the parts are so disposed no air pressure is supplied to the strawberry-positioning or orienting and conveying pocket unit 50-52-53 after it receives the strawberry 67-68 from one of the lower strawberry-feeding troughs 45 and the strawberry-positioning or orienting and conveying pocket unit 50-52-53 is positioned as in FIG. 14.

FIG. 22 illustrates the relative positions of the two slotted air ports 58 in a group or cluster of air ports 58-148 in the stationary air pressure chamber 57 and the corresponding group or cluster of four hole-like air ports 56 in the rotary air pressure cylinder 49 when the rotary air pressure cylinder 49 and one of the strawberry-positioning or orienting and conveying pocket units 50-52 thereon reaches the position in which the parts are shown in FIG. 15, and to which two (2) of the circular hole-like air ports 56 in a group or cluster thereof in the rotary air pressure cylinder 49 have moved into registry with two (2) of the slotted air ports 58 in the stationary air pressure chamber 57 and into registry with one of the vacuum ports 61 in the rotary vacuum chamber 59 and into registry with the (bottom) inlet 55 in the strawberry seat member 50-52-53-54 of the strawberry-positioning or orienting and conveying pocket unit 50-52, as indicated by the dotted line 142 in FIG. 22, thereby causing an initial air blast to be supplied to the strawberry-positioning or orienting and conveying pocket unit 50-52-53-54 sufficient to initiate the operation of lifting the strawberry 67-68 off its seat 52-53-54 in the strawberry-positioning or orienting and conveying pocket unit 50-52, as shown in FIG. 15.

FIG. 23 illustrates the relative position of the parts when two (2) of the circular air ports 56 in a group or cluster thereof in the rotary air pressure cylinder 49 have moved into registration with two (2) of the slotted air ports 58 in the corresponding group or cluster thereof in the stationary air pressure chamber 57 and the other two (2) circular air ports or holes 56 in the aforesaid group or cluster thereof in the rotary air pressure cylinder 49 have moved into registration with the two circular air ports or holes 148 in the corresponding group or cluster thereof in the stationary air pressure chamber 57. In this position of the parts, both of the slotted air ports 58 and both of the hole-like air ports 148 in one group or cluster thereof, are disposed in registration with a corresponding one of the vacuum ports 61 in the outer and rotary vacuum cylinder 59, as illustrated by the four dotted lines 143-144-145-146 in FIG. 23. Thus, when the parts are so disposed a full blast of air is supplied to the corresponding strawberry-positioning or orienting and conveying pocket unit 50-52 sufficient to lift the strawberry 67-68 up off its seat 52-53-54 and radially outwardly in the pocket unit 50-52 and against and partially into the vacuum port 61 in the rotary vacuum cylinder 60 while, at the same time, orienting the strawberry 67-68 in proper position for the decapping operation, as shown in FIG. 16.

k. The Timing Charts Showing FIGS. 24, 25 and 26 of the Drawings

The time intervals which are involved in performing the various operations of the new strawberry decapping apparatus 35, as illustrated in FIGS. 14–17, inclusive, in the drawings, are illustrated in the timing charts shown in FIGS. 24, 25 and 26 of the drawings.

Thus, FIG. 24 illustrates diagramatically the time intervals in terms of degrees of arc of rotation of the rotary vacuum cylinder 59 during which partial vacuum is supplied sequentially to each of the vacuum ports 61 in the rotary vacuum cylinder 59 and the time interval in terms of degrees of arc of rotation in which full vacuum is supplied sequentially to each of the vacuum ports 61 in the rotary vacuum cylinder 59.

FIG. 25 illustrates diagramatically a typical cycle of operations of the rotary air pressure cylinder 49 in terms of degrees of arc of rotation. Thus, the time interval during which each strawberry 67-68 falls from one of the lower strawberry-feeding troughs 45 into one of the strawberry-positioning or orienting and conveying pocket units 50-52, as in FIG. 14, is indicated at A; the time interval during which a partial air flow or blast flows from the rotary air pressure cylinder 49 into one of the strawberry-positioning or orienting and conveying pocket units 50-52 (FIGS. 15 and 16) is indicated at B; the time interval required for the strawberry decapping operation (FIG. 16) is indicated at C; the time interval during which the body of the decapped strawberry drops back into the strawberry-positioning or orienting and conveying pocket unit 50-52 (FIG. 17) is indicated at D; and the time interval during which the body of the decapped strawberry drops from the strawberry-positioning or orienting and conveying pocket unit 50-52 onto the endless takeaway conveyor 70 is indicated at E.

FIG. 26 illustrates diagramatically the relationship of the operation of the rotary vacuum cylinder 59 to the operation of the rotary air pressure cylinder 49 and attached strawberry-positioning or orienting and conveying pocket units 50-52 and the time intervals in terms of degrees of arc of a circle of a complete cycle of rotation of the rotary air pressure cylinder 49 and the rotary vacuum cylinder 59.

l. Significant Characteristics of Certain Features Of Construction and Operation of the Preferred Embodiment Of the New Strawberry Decapping Apparatus as Illustrated in the Drawings Significant characteristics of certain features of construction and operation of the preferred embodiment of the new strawberry decapping apparatus 35 as illustrated in the drawings, are as follows:

1. In a typical and preferred embodiment of the new strawberry decapping apparatus 35, as illustrated in the drawings, the rotary air pressure cylinder 49 is in the order of 3 feet in length and from 3½ inches to 10 inches in diameter, and is preferably made of stainless steel or like corrosion-resistant metal, and the inner strawberry air pressure chamber is in the order of 3½ feet in length and a minimum of 3 inches in diameter, and is preferably made of brass or like corrosion-resistant metal;

2. The upper and rotary vacuum cylinder 59 is preferably in the order of 3½ feet in length and a minimum of 10 inches in diameter, and is preferably made of stainless steel or like corrosion-resistant metal, and the upper stationary vacuum chamber 60 is preferably made of brass or like corrosion-resistant metal;

3. The strawberry-positioning or orienting and conveying pocket units 50-52 on the rotary air pressure cylinder 49 are preferably in the order of 3¼ inches in length and a minimum of 2¾ inches in inside diameter;

4. The degree of vacuum in the rotary vacuum cylinder 59 and in the stationary vacuum chamber 60 is preferably maintained at 2 inches of vacuum and the air pressure in the rotary air pressure cylinder 49 and in the stationary air pressure cylinder 57 is preferably maintained at one (1) pound, with a minimum air flow of 185 cubic feet of uncompressed free air per minute for the 18 strawberry-positioning or orienting and conveying pocket units 50 which are employed in the form of the invention shown in the drawings;

5. The rotary air pressure cylinder 49 and attached strawberry-positioning or orienting and conveying pocket units 50-52 are preferably rotated at a speed of 5⅓ revolutions per minute, representing a capacity of approximately 2 quarts or 96 strawberries per minute or 18 strawberries per revolution of the rotary air pressure cylinder 49 and attached strawberry-positioning or orienting and conveying pocket units 50-52;

6. The ratchet 111 is preferably 10 inches in minimum diameter, has a minimum of 18 teeth thereon spaced 20° apart; and the sprocket gear 104 is preferably 6⅓ inches in diameter and has 40 teeth thereon;

7. The hole-like air ports 56 in the rotary air pressure cylinder 49 are preferably ½ inch in diameter; the slotted air ports 58 in the inner stationary air pressure chamber 57 are preferably ½ inch in width and 1½ inches in length; the hole-like air ports 148 in the stationary air pressure cylinder 57 are preferably ½ inch in diameter; and the vacuum ports 61 in the rotary vacuum cylinder 59 are preferably ⅝ inch in inside diameter and 1⅛ inches in outside diameter and are preferably somewhat star-shaped in form to enable the caps or stems 68 of the strawberries to be drawn or sucked therethrough after the decapping operation;

8. The electric operating motor 78 has the following characteristics: single or 3 phase; 1725 r.p.m.; ½ h.p.;

and totally enclosed for protection against water.

9. The electric operating motor 158 for the endless takeaway conveyor 70 has the same characteristics as have been described above for the electric operating 78; and 10. The speed reducing gear train 170 preferably has a gear reduction ratio of 6 to 1.

m. Miscellaneous Features of Construction

The upper rotary vacuum cylinder 59 and the stationary vacuum chamber 60 therein are provided with a vacuum gauge 137 which is connected with the interior of the stationary vacuum chamber 60 by means of a tube 138 (FIGS. 6 and 40) to indicate the degree of vacuum in the rotary vacuum cylinder 59 and in the stationary vacuum chamber 60.

n. Summary of the Operation of the New Strawberry Decapping Apparatus

In the use of the new strawberry decapping apparatus 35 the strawberries are fed manually or otherwise into the downwardly inclined upper strawberry-receiving troughs 43 from which they travel by gravity along the bottom walls 83 thereof to the lower end portions of the troughs 43 where they are stopped and held by the upright transverse lower end wall 84 which is formed as an upward extension of the supporting base or platform 44 for the upper troughs 43 (FIG. 7).

At the start of the operation of the new strawberry decapping apparatus 35, the electric operating motor 78 is set in operation by manipulation of the control switch 156 (FIG. 5); the electric operating motor 158 for the endless takeaway belt conveyor is set in operation; and the vacuum source 166 and the air presure source 172 are energized by operation of the control switches 163 and 173, respectively. Power is then delivered from the operating motor 78 through the shaft 77 and the eccentric cam plate 76 and eccentric mounting of the vibratory rod 73 to vibrate the rod 73-91 which acts, through the pivotal connections 179 and the arms 182 to vibrate the upper strawberry-receiving troughs 43 on the rubber or like resilient members 183 and their mountings 184-185 (FIGS. 43-44-45), thereby vibrating the upper troughs 43 and thus facilitating the downward movement of the strawberries 67-68 in the upper troughs 43 toward the lower end wall 84 thereof.

As the electric operating motor 78 continues to operate, power is transmitted therefrom through the belt and pulley power transmission means 121 to the shaft 119 of the speed reducing gear unit 120 and thence by way of the eccentric unit 118-117 to the ratchet operating rod 116 and its bifurcated yoke member 112 and the pawl 114 thereon to the ratchet 111, thereby imparting a step by step rotary movement to the ratchet 111 (counterclockwise, FIG. 5). This movement of the ratchet 111 acts, through the shaft 101, the sprocket gear 100, and the sprocket chain 99, to impart a step by step rotary movement to the sprocket gear 103, and the cam plate 104 and the cams 102 thereon (clockwise, FIG. 5). As the cam plate 104 and the cams 102 thereon are thus rotated in a step by step movement, the cams 102 successively engage the edge portion 103 of the link member 94, thereby pivoting the link member 94 at 95. This motion of the link member 94 acts, through the pivotal connection 93 and the link member 92 and the linkage 80-91-89-90 to pivot the supporting member 87 for the pin-supporting rod member 86, at 90, (clockwise, FIGS. 5 and 30) thereby lowering the pin-supporting rod member 86 and all of the strawberry-ejecting pin members 81 thereon into their lowered position, as in FIGS. 10 and 30, whereupon the strawberries roll by gravity onto the upper end portions of the strawberry-ejecting pin members 81, as in FIG. 10.

However, as the apparatus continues to operate cyclically and as each of the cam members 102 on the cam plate member 104 moves away from the edge portion 103 of the operating link member 94 (clockwise, FIGS. 1 and 5), the counterweight member 96 pivots downwardly on its pivotal mounting 95, and this movement of the counterweight member 96 acts, through the operating link member 94 and the parts 93-92-80-91-89-90 to pivot the operating member 87 for the strawberry-ejecting pin members 86 (counterclockwise, FIGS. 5 and 30). This action raises the strawberry-ejecting pin members 81 in the slots 164 (FIG. 30) and thus lifts the strawberries 67-68 off the bottom walls 83 of the upper strawberry-receiving troughs 43 upwardly above the lower end wall 84 thereof, over which the strawberries are thus ejected and fall by gravity onto the lower strawberry-feeding troughs 45, as shown in FIG. 11. Thereafter, continued operation of the operating parts for the pin-supporting rod member 86 and the strawberry ejecting pin members 81 mounted thereon returns the pin-supporting rod member 86 and the strawberry-ejecting pin members 81 thereon to their raised position as in FIG. 11.

As the strawberries are thus ejected from the upper strawberry-receiving troughs 43 and fall by gravity onto the inclined bottom walls of the lower strawberry-feeding troughs 45 they roll by gravity down the lower troughs 45 until they engage the first stationary gate or stop member 107 by which they are momentarily held in the position shown in FIG. 12 with the lower end portions of the lower strawberry-feeding troughs 45 resting on the horizontally extending resilient bumper or supporting member 47, as shown in FIG. 7; it being noted that the upper end portions of the lower strawberry-feeding trough members 45 are pivotally mounted, as at 46, on the supporting frame 36 (FIG. 7).

As the sprocket chain 99 is driven, in the manner described above, power is delivered by way of the sprocket gear 97 and the shaft 98 to the rotary air pressure cylinder 49 and the strawberry-positioning into or orienting and conveying pocket units 50-52 thereon, thereby imparting a step by step rotary motion to the rotary air pressure cylinder 49 and the strawberry-positioning or orienting and conveying pocket units 50-52 thereon (clockwise, FIG. 7). During this step by step rotary movement of the rotary air pressure cylinder 49 and the strawberry-positioning or orienting and conveying pocket units 50-52 thereon, the laterally projecting cam members 109 on the sides of the pocket units 50-52 successively engage the projecting cam fingers or cam followers 105 on the lower end portions of each of the lower strawberry-feeding troughs 45. This action pivots the lower trough 45 on its pivotal mounting 46 (counterclockwise, FIG. 7) from its lowered position into and through an intermediate position and nto its uppermost position, as shown in FIG. 7. The same action pivots the lower end portion of the lower trough upwardly on its pivotal mounting 46 and thus raises the strawberries 67-68 thereon upwardly above the stationary gate or stop member 107, whereupon the lowermost strawberry in the trough 45 falls by gravity into the corresponding strawberry-positioning or orienting and conveying pocket unit 50-52 on the rotary air pressure cylinder 49, as shown in FIG. 14.

However, as the lower strawberry-feeding trough 45 is thus pivotally moved from its lowermost position through its intermediate position and into its raised position as shown in FIG. 7, and the lowermost strawberry 67-68 is delivered into a corresponding one of the strawberry-positioning or orienting pocket cam units 50-52, the lowermost strawberry-feeding or delivery trough is moved into engagement with one of the arcuate-shaped depending stop fingers 182 on the second gate or stop member 179 (FIGS. 7, 34 and 35), and this action prevents a second strawberry in the lower trough 45 from being delivered into the corresponding strawberry-positioning or orienting pocket unit 50-52, and thus assures that only one strawberry at a time will be delivered from each of the lower strawberry-feeding or delivery troughs 45 into the corresponding one of the strawberry-positioning or orienting and conveying pocket units 50-52.

As the rotary air pressure cylinder 49 and the strawberry-positioning or orienting and conveying pocket units 50-52 thereon continue to rotate (clockwise, FIGS. 14 and 15) the open radially outer end portions 51 of the strawberry-positioning or orienting and conveying pocket units 50-52 are sequentially moved through the successive steps or positions shown in FIGS. 14 and 15 and which are, in part, diagramatically illustrated in FIGS. 21–23, inclusive. Thus, by reference to FIGS. 14 and 21, it will be noted that the two air port slots 58 and the two air port holes 148 in a group or cluster thereof are disposed out of registration with the corresponding group or cluster of air port holes 56 in the rotary air pressure cylinder 49 and out of registry with the corresponding air port 61 in the rotary vacuum cylinder 59, as is illustrated diagramatically in FIG. 21, and as shown by the dotted line 141 in FIG. 21.

However, as the rotary air pressure cylinder 49 continues to rotate (clockwise, FIG. 14) and the rotary vacuum cylinder 59 continues to rotate (counterclockwise, FIG. 14) into the positions in which they are shown in FIG. 15, the rotary air pressure cylinder 49 and the strawberry-positioning or orienting and conveying pocket unit 50-52-53-54 mounted thereon, reach the position in which these parts are shown in FIG. 15, and in which two of the air port holes 56 which form part of a cluster or group of four (4) of such air port holes 56 in the rotary air pressure cylinder 49 (which are disposed immediately below the lower or radially inner end of the cylindrical strawberry-positioning or conveying pocket unit 50-52-53-54) move into registration with two of the corresponding slotted air ports 58 in the stationary air pressure cylinder 57. However, in this position of the parts, the other two air port holes 56 in the aforesaid group or cluster thereof, have not moved into registration with the corresponding two circular air port holes 148 in the stationary air pressure cylinder 57, as is illustrated diagramatically in FIG. 22.

Accordingly, when the parts are disposed in this position (as in FIGS. 15 and 22) a preliminary or initial blast of air flows from two of the slotted air ports 58 in the stationary air pressure cylinder 57 through the corresponding two circular air port holes 56 in the rotary air pressure cylinder 49 into a corresponding one of the star-shaped air ports 61 in the rotary vacuum cylinder 59, as illustrated diagramatically in FIG. 22 of the drawings, and as indicated by the dotted line 142 in FIG. 22; it being noted that the other two circular air port holes 56 in the aforesaid group or cluster of four of the same are, in this position of the parts (as in FIGS. 15 and 22), still disposed out of registration with the corresponding two circular air port holes 148 in the stationary air pressure cylinder 57, as illustrated in FIG. 22.

Accordingly, when the parts are disposed as in FIG. 15, and as illustrated in FIG. 22, an initial or preliminary blast of air flows from the stationary air pressure cylinder 57 through two (2) of the slotted air ports 58 in the stationary air pressure cylinder 57 through two (2) of the circular air port holes 56 in the rotary air pressure cylinder 49 disposed in registration therewith, and thence through the open lower end 55 of the neck 54 of the strawberry seat member 52-53-54 in the corresponding strawberry-positioning or orienting and conveying pocket unit seat 52-53. This preliminary air blast, in conjunction with the vacuum in the corresponding vacuum port 61 in the rotary vacuum cylinder 59, partially positions or orients the strawberry 67 and its stem or cap 68 on the strawberry seat member 52-53-54 by turning the strawberry 67-68 so that its cap or stem 68 is disposed at one side of the body of the strawberry, as shown in FIG. 15.

Continued rotation of the rotary air pressure cylinder 49 and the strawberry-positioning or orienting and conveying pocket unit 50-52, from the position in which the parts are shown in FIG. 15 into the position in which they are shown in FIG. 16, causes the open radially outer end portions 51 of the strawberry-positioning or orienting and conveying pocket unit 50-52 and the entire group or cluster of four (4) air port holes 56 therebelow in the rotary air pressure cylinder 49 to move into full registration with the corresponding group of two (2) slotted air ports 68 and two (2) circular air port holes 148 in the stationary air pressure chamber 57 and into registration with a corresponding one of the star-shaped air ports 61 in the rotary vacuum chamber 59, as is illustrated in FIG. 23, and as indicated by the dotted lines 143-144-145-146, in FIG. 23. This action causes a full blast of air to be supplied (FIG. 23) from the stationary air pressure cylinder 57 and the rotary air pressure cylinder 49 by way of the then completely registered air pressure ports 58-148-58-56, through the open lower end 55 of the strawberry seat member 52-53-54 and through the latter to lift the strawberry 67-68 off from its seat member 52-53-54 into the position in which it is shown in FIG. 16 with the cap or stem 68 thereof disposed at the top of the strawberry 67-68 and into a position into which it has been forced and sucked and held in the corresponding one of the star-shaped vacuum ports 61 in the rotary vacuum cylinder 59, as shown in FIG. 16.

During this operation the strawberry 67-68 is supported in the position in which it is shown in FIG. 16 by the combination of air pressure from below and suction or vacuum from above, and as the rotary vacuum cylinder 59 and the rotary air pressure cylinder 49 continue to rotate (from the position in which they are shown in FIG. 16 into the position in which they are shown in FIG. 17) they carry the strawberry 67-68 with them into engagement with the decapping means or knife 63-64 which thereupon decaps or cuts the cap 68 from the body 67 of the strawberry. The body 67 of the thus decapped strawberry then drops by gravity back into the strawberry-positioning or orienting and conveying pocket unit 50-52, as shown in FIG. 17, from which, upon further rotation of the rotary air pressure cylinder 49 and attached strawberry-positioning or orienting and conveying pocket unit 50-52, the body 67 of the thus decapped strawberry is dropped onto the endless takeaway conveyor 70 by which it is conducted to a takeaway position for removal and use.

As the cap or stem 68 of the strawberry 67-68 is thus cut from the body of the strawberry it is sucked into the rotary vacuum cylinder 59 through one of the star-shaped vacuum ports 61 and thence into the stationary vacuum chamber 60 from which it is drawn or sucked out through the vacuum line in the direction of the arrows 71 (FIGS. 8 and 39) into the flexible hose connection and thence to the combination vacuum and waste disposal unit 162 for disposal.

It will be noted that the parts of the new strawberry decapping apparatus 35 with which the strawberries come in contact in the use of the new strawberry decapping apparatus 35 are readily accessible for cleaning and sterilizing and that certain of such parts, including the strawberry ejecting pin members 81 and the strawberry-positioning or orienting and conveying pocket units and the seat members 52-53-54 therein, may be readily removed from their positions of use for cleaning, sterilizing, repair and replacement.

In the use of the new strawberry decapping apparatus as illustrated in the drawings, and as described above, the combination of the air pressure from below the strawberries into the strawberry-positioning or orienting and conveying pocket units 50-52, and the vacuum or suction from above the strawberries, as applied by the rotary vacuum cylinder 59, effectively positions or orients the strawberries and holds them in proper position for advancement to and through the decapping operation while, at the same time, preventing bruising or other damage to the strawberries and preventing them from being drawn or sucked up through the vacuum ports 61 in the rotary vacuum cylinder 59 prior to the decapping operation.

O. Modified Form of the Invention

It will be noted that in the preferred and typical embodiment of the invention illustrated in the drawings, and as described above, the invention has been shown and described as adapted for use in a minimal production operation and with only one (1) strawberry being decapped at a time. However, the production capacity of the new strawberry decapping apparatus may be increased without substantial changes in design, to decap a crate or 16 quarts, or approximately 768 strawberries per minute. This may readily be accomplished by increasing the overall sizes and dimensions and surface areas of certain of the operating parts of the new strawberry decapping apparatus including the rotary air pressure cylinder 49 and rotary vacuum cylinder 59, and related parts; the number of strawberry-positioning or orienting and conveying pocket units 50-52 on the rotary air pressure cylinder 49; the number of clusters or groups and spiral rows of air port holes 56 in the rotary air pressure cylinder 49; the number of clusters or groups and spiral rows of vacuum ports 61 in the rotary vacuum cylinder 59.

Thus, for example, to increase the production capacity of the new strawberry decapping apparatus as discussed above, the number of spiral rows of strawberry-positioning or orienting and conveying pocket units 50-52 on the rotary air pressure cylinder 49 may be increased to 144 of such pocket units arranged in a 8 spiral rows of 18 pocket units 50-52 in each spiral row rather than two spiral rows of 9 pocket units 50-52 in each row, as in the form of the invention illustrated in the drawings. In such a modification of the invention, the air pressure in the rotary air pressure cylinder 49 would remain at 1 pound and the vacuum in the rotary vacuum cylinder 59 would remain at 2 inches. In this modification of the invention, eight (8) of the strawberry-positioning or orienting and conveying pocket units 50-52 would be operating at one time and the apparatus would decap eight (8) strawberries in each decapping operation, rather than only one (1) strawberry in each decapping operation, as in the form of the invention illustrated in the drawings.

In such modification of the invention, as discussed above, the number of teeth in the operating ratchet 111 and in the sprocket gears 97 and 100, etc., would be correspondingly increased in multiples of the numbers of teeth embodied in these parts as illustrated in the drawings.

It will thus be seen from the foregoing description, considered in conjunction with the accompanying drawings, that the present invention provides a new and improved strawberry decapping apparatus having the desirable advantages and characteristics and accomplishing its intended objects including those hereinbefore pointed out and others which are inherent in the invention.

I claim:

1. Strawberry decapping apparatus for decapping or cutting the stems or caps of strawberries from the bodies thereof, comprising:
   a. a supporting frame;
   b. strawberry decapping means mounted on the said supporting frame for decapping or cutting the stems or caps from the bodies of the strawberries;
   c. rotary carrier means rotatably mounted on the said supporting frame and including
      1. a plurality of strawberry conveying units arranged in spaced relationship on the said rotary carrier means and each adapted to receive and to convey a strawberry into engagement with the said decapping means;
   d. means for rotating the said rotary carrier means and the said strawberry conveying units thereon in a step by step movement so as to move the strawberries in the said strawberry conveying units sequentially into engagement with the said strawberry decapping means so as to decap or cut the stems or caps from the bodies of the strawberries;
   e. strawberry feeding means mounted on the said supporting frame adjacent the said rotary carrier means; and
   f. means coacting with the said rotary carrier means and with the said strawberry feeding means for feeding strawberries one at a time from the said strawberry feeding means into each of the said strawberry conveying units.

2. Strawberry decapping apparatus for decapping or cutting the stems or caps from the bodies of strawberries comprising:
   a. a supporting frame;
   b. decapping means mounted on the said supporting frame for decapping or cutting the stems or caps from the bodies of the strawberries;
   c. a first rotary carrier means rotatably mounted on the said supporting frame and including
      1. a first generally cylindrical rotary carrier member rotatably mounted on the said supporting frame and having a. a hollow interior;
b. an outer peripheral surface; and
c. a plurality of strawberry conveying units mounted on the said outer peripheral surface of the said generally cylindrical first rotary carrier member and each adapted to receive and to convey a strawberry and each having
1. an open radially inner or lower end; and
2. an open radially outer or upper end;
d. a second rotary carrier means including
1. a second generally cylindrical second rotary carrier member rotatably mounted on the said supporting frame above the said first generally cylindrical rotary carrier member and having
2. a hollow interior;
e. strawberry feeding means mounted on the said supporting frame for feeding strawberries one at a time into each of the said strawberry conveying units through the said open radially outer or upper end thereof;
f. air pressure supply means for supplying air under pressure sequentially from the hollow interior of the said first generally cylindrical rotary carrier member into each of the said strawberry conveying units thereon through the said open radially inner or lower end thereof against the body of a strawberry disposed in one of the said strawberry conveying units to initiate movement of the strawberry radially outwardly in one of the said strawberry conveying units toward and into engagement with the said second generally cylindrical rotary carrier member;
g. vacuum means for applying vacuum sequentially from the said hollow interior of the said second generally cylindrical rotary carrier member to the said open radially outer or upper end of each of the said strawberry conveying units;
h. the said air pressure supply means and the said vacuum means coacting sequentially to move the strawberries in the said strawberry conveying units outwardly therein toward and into engagement with the said second generally cylindrical rotary carrier member while at the same time positioning and holding the strawberry in the said strawberry conveying unit in position to enable the strawberry to engage the said decapping means and to enable the said decapping means to cut or decap the stem or cap from the body of the strawberry as the strawberry is moved by the coaction of the said first generally cylindrical rotary carrier member and the said second generally cylindrical rotary carrier member into engagement with the said decapping means; and
i. power means for rotating the said first generally cylindrical rotary carrier member and the said strawberry conveying units thereon and the said second generally cylindrical rotary carrier member in timed relationship with each other.

3. Strawberry decapping apparatus as defined in claim 2 in which
a. the said strawberry feeding means includes
1. strawberry feeding trough members mounted on the said supporting frame adjacent the said first generally cylindrical rotary carrier member for feeding strawberries one at a time from the said strawberry feeding means into each of the said strawberry conveying units through the said open radially outer or upper end thereof.

4. Strawberry decapping apparatus as defined in claim 2 in which
a. the said generally cylindrical first rotary carrier member is arranged in a generally horizontal position on the said supporting frame; and in which
b. the said strawberry conveying units are spaced axially and circumferentially on the said generally cylindrical first rotary carrier member; and in which
c. the said strawberry feeding means includes
1. a row of strawberry feeding trough members each having
a. an upper end portion pivotally mounted on the said supporting frame, and each having
b. an open and lower end portion disposed adjacent the said first generally cylindrical rotary carrier member and each adapted to feed a strawberry into one of the said strawberry conveying units through the said radially outer open or upper end thereof;
c. the said strawberry feeding trough members being inclined downwardly from their said pivotally mounted upper end portions to their lower end portions;
d. gate means mounted in the said supporting frame adjacent and extending across the said open lower end portions of the said strawberry feeding trough members for holding the strawberries in the said strawberry feeding trough members adjacent the said open lower ends thereof; and
e. coacting cam means on the said first generally cylindrical rotary carrier member and on the said strawberry feeding trough members for sequentially pivoting the said strawberry feeding trough members on their said pivotally mounted upper end portions so as to sequentially lift the said open lower end portions of the said strawberry feeding trough members above the said gate means and allow the strawberries to drop by gravity from the said open lower end portions of the said strawberry feeding trough members into the said strawberry conveying units.

5. Strawberry decapping apparatus as defined in claim 4 in which the said coacting cam means includes
a. a first cam member on each of the said strawberry conveying units; and
b. a second cam member on the lower end portion of each of the said strawberry feeding trough members; and in which
c. the said first cam member on each of the said conveying units engages the said second cam member on the lower end portion of one of the said strawberry feeding trough members as the said first generally cylindrical rotary carrier member is rotated, thereby sequentially pivoting the said one of the said strawberry feeding trough members into position to discharge a strawberry over the said gate means and into one of the said strawberry conveying units.

6. Strawberry decapping apparatus as defined in claim 5 in which
a. each of the said strawberry feeding trough members has
1. a cam member mounted on the said lower end portion thereof; and in which 2. the said cam means on the said first rotary carrier member includes
   a. a cam member on each of the said strawberry conveying units and each adapted to engage the said cam member on one of the said strawberry feeding trough members so as to pivot the said strawberry feeding trough member on its pivotally mounted upper end portion so as to raise the said open lower end portion thereof above the said gate means and allow a strawberry to drop by gravity from one of the said strawberry feeding trough members into one of the said strawberry conveying units through the said open outer or upper end thereof.

7. Strawberry decapping apparatus as defined in claim 5 which includes
   a. an upper row of strawberry receiving trough members mounted in the said supporting frame above the said row of strawberry feeding trough members and each including
      1. an upper end portion adapted to have a strawberry deposited thereon, adapted to discharge a strawberry into one of the said strawberry feeding trough members;
      2. an upright lower end wall member extending across the lower end portion of said strawberry-receiving trough members and adapted to prevent the strawberries from being discharged from the said strawberry receiving trough members into the said strawberry feeding trough members therebelow;
   b. the said strawberry-receiving trough members in the said row thereof being inclined downwardly from their upper end portions to their lower end portions;
   c. a strawberry supporting and ejecting member movably mounted in the said lower end portion of each of the said strawberry receiving trough members for movement in a generally vertical plane from a lowered position in which each of said strawberry supporting members is adapted to support a strawberry in one of the said strawberry-receiving trough members and adjacent the said upright lower end wall of the said strawberry receiving trough members into a raised position in which the said strawberry supporting member is adapted to lift the strawberry disposed thereon upwardly and to discharge it over the said upright and wall member into one of the said strawberry-feeding trough members therebelow;
   d. means movably mounted on the said supporting frame for supporting the said strawberry supporting and ejecting members; and
   e. means coacting in timed relationship with the said means for rotating the said first generally cylindrical rotary carrier member for operating the said strawberry supporting and ejecting members in timed relationship with the rotary movement of the said first generally cylindrical rotary carrier member and the said strawberry conveying units thereon.

8. Strawberry decapping apparatus as defined in claim 7 which includes
   a. means for vibrating the said strawberry receiving trough members to facilitate downward movement of the said strawberries deposited thereon and onto the said strawberry supporting and ejecting members.

9. Strawberry decapping apparatus as defined in claim 8 in which the said means for vibrating the said strawberry receiving trough members includes
   a. resilient mounting means for movably mounting the said strawberry-receiving trough members on the said supporting frame; and
   b. means for vibrating the said strawberry-receiving trough members on the said resilient mounting means.

10. Strawberry decapping apparatus as defined in claim 2 in which each of the said strawberry conveying units is in the form of
    a. a generally cylindrical strawberry conveying member having therein
       1. a strawberry supporting seat member disposed between the said radially inner or lower and the said radially outer or upper end of the said generally cylindrical strawberry conveying member; and in which each of said strawberry supporting seat members has
          a. an open lower end in communication with the said hollow interior of the said first and generally cylindrical rotary carrier member to enable air under pressure to be blown through the said generally cylindrical strawberry conveying member and through the said open lower end of the said strawberry supporting seat member therein to dislodge a strawberry from the said strawberry supporting seat member and to blow the strawberry radially outwardly and upwardly toward and into engagement with the said second generally cylindrical rotary carrier member.

11. Strawberry decapping apparatus as defined in claim 2 in which the said first generally cylindrical rotary carrier member has
    a. axially spaced end walls; and
    b. an outer peripheral surface extending between said axially spaced end walls; and in which
    c. the said strawberry conveying units are arranged in staggered relationship axially and circumferentially on and around the said outer peripheral surface of the said first generally cylindrical rotary carrier member between the said axially spaced end walls therof.

12. Strawberry decapping apparatus as defined in claim 11 in which
    a. the said strawberry conveying units are arranged in a plurality of rows of said strawberry conveying units; and in which
    b. each of said rows includes a plurality of said strawberry conveying units.

13. Strawberry decapping apparatus as defined in claim 11 in which the said second generally cylindrical rotary carrier member includes
    a. a generally cylindrical outer wall and having
       1. axially spaced end walls; and
       2. an outer peripheral surface extending between said axially spaced end walls; and in which
       3. the said generally cylindrical wall of said second generally cylindrical rotary carrier member has therein
          a. a plurality of vacuum ports formed in and extending through the said generally cylindrical wall of said second generally cylindrical rotary carrier member and arranged in the same pattern as the said strawberry conveying units are arranged on the said first generally cylindrical rotary carrier member; and in which b. the said vacuum ports in the said generally cylindrical wall of the said second generally cylindrical rotary carrier member are adapted to be moved sequentially into registration with the said open radially outer ends of the said strawberry conveying units on the said first generally cylindrical rotary carrier member as the said first generally cylindrical rotary carrier member and the said second generally cylindrical rotary carrier member are rotated in timed relationship with each other.

14. Strawberry decapping apparatus as defined in claim 13 which includes
   a. means for rotating the said first generally cylindrical rotary carrier member and the said strawberry conveying units thereon and the said second generally cylindrical rotary carrier member in a step by step timed relationship with each other in intervals each consisting of a predetermined number of degrees of arc of a circle in each step.

15. Strawberry decapping apparatus as defined in claim 13 which includes
   a. a stationary vacuum chamber arranged within and having communication with the said second and generally cylindrical rotary carrier member for applying vacuum to the said vacuum ports in the said second generally cylindrical rotary carrier member and for drawing the stems or caps from the said strawberries after the decapping operation through the said vacuum ports in the said second and generally cylindrical rotary carrier member into he said stationary vacuum chamber and for discharge therefrom.

16. Strawberry decapping apparatus as defined in claim 15 in which
   a. the said first and generally cylindrical rotary carrier member has
      1. a plurality of air pressure outlet ports formed therein and arranged in the same relationship as the said vacuum ports in the said second generally cylindrical rotary carrier member; and in which the said strawberry decapping apparatus includes
   b. a stationary air pressure chamber stationarily mounted within the said first and generally cylindrical rotary carrier member and having therein
      1. air pressure outlet ports for supplying air under pressure to the said air pressure outlet ports in the said first and generally cylindrical rotary carrier member as the latter is rotated by the said power means therefor.

17. Strawberry decapping apparatus as defined in claim 7 in which
   a. the said strawberry supporting and ejecting members are removably mounted on the said supporting means therefor.

18. Strawberry decapping apparatus as defined in claim 16 in which
   a. the said stationary air pressure chamber in the said first and generally cylindrical rotary carrier member is generally cylindrical in form, and includes
      1. an outer peripheral wall surface having therein
      2. a plurality of groups or clusters of air pressure outlet ports formed therein and arranged in a row axially of the said outer peripheral wall surface of the said stationary air pressure chamber; and in which
   b. the said first and generally cylindrical rotary carrier member has
      1. a plurality of groups or clusters of air pressure outlet ports formed therein and arranged in staggered relationship axially and circumferentially of the outer peripheral wall surface of the said first and generally cylindrical rotary carrier member; and in which
   c. the groups or clusters of air pressure outlet ports in the said first and generally cylindrical rotary carrier member are adapted to be successively moved into registration with the groups or clusters of air pressure outlet ports in the said stationary air pressure chamber as the said first and generally cylindrical rotary carrier member and the said strawberry conveying units thereon are rotated.

19. Strawberry decapping apparatus as defined in claim 18 in which
   a. the said second and generally cylindrical rotary carrier member is in the form of a vacuum cylinder having
      1. a plurality of vacuum ports formed therein and arranged in staggered relationship axially and circumferentially on the outer peripheral surface of the said first and generally cylindrical rotary vacuum cylinder; and in which
   b. the said vacuum ports in the said generally cylindrical rotary vacuum cylinder are adapted to be moved sequentially into registration with the said groups or clusters of air pressure outlet ports in the said first and generally cylindrical rotary carrier member and into registration with the said conveying units as the said first and generally cylindrical rotary carrier member and the said second and generally cylindrical rotary carrier member are rotated.

20. Strawberry decapping apparatus as defined in claim 2 in which
   a. the said decapping means is disposed in the path of rotary movement of the said first and generally cylindrical rotary carrier member and the said strawberry conveying units mounted thereon; and in which
   b. the body of each strawberry after the decapping operation drops by gravity into one of the said strawberry conveying units and is discharged therefrom as the said first and generally cylindrical rotary carrier unit and the said strawberry conveying units thereon are rotated.

21. Strawberry decapping apparatus as defined in claim 20 which includes
   a. a takeaway conveyor disposed below the said first and generally cylindrical rotary carrier member and the said strawberry conveying units mounted thereon; and in which
   b. the decapped strawberries are discharged from the strawberry conveying units onto the said takeaway conveyor after the decapping operation.

22. Strawberry decapping apparatus as defined in claim 4 which includes
   a. a second gate means mounted in the said supporting frame above the said first gate means and extending across the lower end portions of the said strawberry feeding trough members; and in which
   b. the said coacting cam means engage sequentially and pivot the lower end portion of each of the said strawberry feeding trough members into a first and raised strawberry discharging position in which a strawberry is discharged therefrom into one of the said conveying units; and in which c. the said coacting cam means raises the lower end portion of the said strawberry feeding trough member into a second and raised position in which it engages the said second gate means for stopping the downward movement of a second strawberry from the said strawberry feeding trough member into one of the said conveying units.

23. Strawberry decapping apparatus as defined in claim 22 in which a. the said second gate means has a plurality of depending strawberry stopping fingers formed thereon which project into the said strawberry feeding trough members when the said strawberry feeding trough members reach the said second and raised position.

24. Strawberry decapping apparatus comprising
   a. a supporting frame;
   b. strawberry feeding means;
   c. strawberry decapping means mounted on the supporting frame for cutting the caps or stems from the bodies of strawberries;
   d. rotary pneumatic conveying means rotatably mounted on the said supporting frame between the said strawberry feeding means and the said decapping means and adapted to convey strawberries from the said strawberry feeding means to the said decapping means; said rotary pneumatic means including 1. a generally cylindrical rotary air pressure strawberry carrier member rotatably mounted in the said supporting frame and including an outer peripheral surface having mounted thereon in a predetermined pattern
       a. a plurality of strawberry positioning or orienting and conveying pocket units each adapted to have a strawberry deposited therein from the said strawberry feeding means and to convey the strawberry to the said strawberry decapping means;
     2. a generally cylindrical rotary vacuum carrier member rotatably mounted on the supporting frame above and in generally coplanar relationship with the said generally cylindrical rotary air pressure carrier member and including an outer peripheral surface having therein a plurality of combination vacuum applying and strawberry conveying ports arranged in a predetermined pattern corresponding to the pattern in which the said strawberry positioning or orienting and conveying pockets are mounted on the said generally cylindrical rotary air pressure strawberry carrier member;
     3. means for rotating the said generally cylindrical rotary air pressure carrier member and the said generally cylindrical rotary vacuum carrier member in a step by step rotary motion and in timed relationship with each other;
     4. means for applying vacuum to the said generally cylindrical rotary vacuum carrier and to the said combination vacuum-applying and strawberry carrying ports therein from within the said generally cylindrical rotary vacuum carrier and above each of the combination vacuum-applying and strawberry-carrying ports;
     5. means for supplying air under pressure to the said generally cylindrical rotary air pressure and strawberry carrier member and sequentially to each of the said strawberry positioning or orienting and conveying pocket units thereon to force the strawberry therein radially outwardly in the said strawberry positioning or orienting and conveying pocket unit into engagement with a corresponding one of the said combination vacuum-applying and strawberry carrying ports in the said generally cylindrical rotary vacuum carrier member; and
     6. the vacuum applied to the said combination vacuum-applying and strawberry-carrying ports in the said generally cylindrical rotary vacuum and carrier member from above the strawberry in one of the said strawberry-positioning or orienting and conveying pocket units coacting with the said air pressure applied to the said strawberry from below the strawberry to hold the said strawberry partially in the said strawberry positioning or orienting and conveying pocket unit and partially in the corresponding vacuum-applying and strawberry-carrying port in the said generally cylindrical rotary vacuum carrier as the said strawberry is moved into engagement with the said decapping means for removal of the cap or stem therefrom.

25. Strawberry decapping apparatus as defined as defined in claim 24 in which the said generally cylindrical rotary air pressure and carrier member is rotated in a step by step timed relationship with the said generally cylindrical rotary vacuum and carrier member and to a first work station at which a strawberry is deposited from the said strawberry feeding means into one of the said strawberry positioning or orienting and conveying pocket units at a second work station at which the strawberry is forced radially outwardly in the said pocket unit into engagement with one of the said combination vacuum-applying and strawberry carrying ports in the said generally cylindrical rotary vacuum and carrier member to a third and decapping work station at which the strawberry engages the said decapping means and has the cap or stem cut therefrom; and in which the said strawberry decapping apparatus includes a. a seat member in each of the said pocket units into which the strawberry falls from the said strawberry feeding means; and
   b. means for sequentially applying a partial or relatively lower air pressure blast from the said first and generally cylindrical rotary air pressure and carrier member into each of the said pocket units as each of the said pocket units moves from the said first work station to the said second work station and into partial registration with one of the said combination vacuum-applying and strawberry carrying ports to force the strawberry off from the said seat member and radially outwardly in the said pocket unit and toward a corresponding one of the said vacuum-applying and strawberry carrying ports in the said generally cylindrical rotary vacuum and carrier member while at the same time orienting the strawberry with its cap or stem disposed in upright position in the corresponding one of the said vacuum-applying and strawberry carrying ports for movement into engagement with the said decapping means.

26. Strawberry decapping apparatus as defined in claim 25 which includes
   a. means for sequentially supplying a relatively high or full air pressure blast from the said first and generally cylindrical rotary air pressure and carrier member into each of the said pocket units as each of the said pocket units moves into full registration with one of the said combination vacuum-applying and strawberry carrying ports in the said generally cylindrical vacuum and carrier member and the strawberry is held by the combined action of the vacuum applied to the strawberry from above the said combination vacuum-applying and strawberry carrying port and the air pressure applied to the strawberry from below the strawberry through the said pocket unit as the strawberry is moved into the said third work station and into engagement with the said decapping means.

27. Strawberry decapping apparatus as defined in claim 26 in which the said strawberry feeding means includes
   a. a plurality of strawberry feeding members movably mounted in the said supporting frame adjacent the said generally cylindrical rotary air pressure and carrier member; and in which each of the said strawberry feeding members is adapted to be moved into a position to discharge a strawberry therefrom into one of said pocket units; and in which the said strawberry decapping apparatus includes
   b. means under the control of the said rotary air pressure generally cylindrical and carrier member and coacting sequentially with each of the said strawberry-feeding members for moving each of the said strawberry feeding members sequentially into position to discharge a strawberry therefrom into one of the said pocket units as the said generally cylindrical rotary air pressure and carrier member is rotated in a step by step rotary motion.

28. Strawberry decapping apparatus as defined in claim 26 which includes
   a. a takeaway conveyor movably mounted below the said decapping means; and in which
   b. the body of each of the said strawberries after the decapping operation falls by gravity back into one of the said pocket units, and is discharged from the said pocket unit onto the said takeaway conveyor as the said generally cylindrical rotary air pressure and carrier member is rotated in a step by step rotary movement past the said third and decapping work station.

29. A strawberry decapping apparatus for decapping or cutting the stems or caps from the bodies of strawberries, comprising:
   a. a supporting frame;
   b. strawberry decapping means mounted on the said supporting frame for decapping the caps or stems from the bodies of the strawberries;
   c. carrier means including
      1. a generally cylindrical rotary carrier member rotatably mounted on the said supporting frame for moving the strawberries into engagement with the said decapping means;
   d. strawberry feeding means for feeding the strawberries onto the said rotary carrier member;
   e. means for operating the said rotary carrier member;
   f. the said rotary carrier member including
      1. a plurality of strawberry conveying units mounted on the said rotary carrier member at spaced intervals thereon and each adapted to receive a strawberry from the said strawberry feeding means and to convey the said strawberry into engagement with the said decapping means;
   g. the said generally cylindrical rotary carrier having
      1. a generally cylindrical peripheral outer surface; and the said strawberry conveying units being in the form of
      2. a row of strawberry conveying pocket units arranged in spaced relationship and in spiral rows on and axially and circumferentially of the said generally cylindrical rotary carrier member on the said generally cylindrical peripheral outer surface thereof.

30. Strawberry decapping apparatus as defined in claim 29 in which
   a. the said strawberry feeding means includes
      1. a plurality of strawberry feeding trough members mounted on the said supporting frame adjacent the said generally cylindrical rotary carrier member and each adapted to feed a strawberry into one of the said strawberry conveying pocket units.

31. Strawberry decapping apparatus as defined in claim 30 in which
   a. each of the said strawberry feeding trough members is mounted on the said supporting frame in a downwardly inclined position and each having a lower end portion disposed adjacent one of the said strawberry conveying pocket units; and in which the said strawberry decapping apparatus includes
   b. means for sequentially feeding the strawberries from the lower end portions of the said strawberry feeding trough members into the said strawberry conveying pocket units.

32. Strawberry decapping apparatus comprising
   a. a supporting frame;
   b. strawberry decapping means mounted on the said supporting frame;
   c. strawberry feeding means mounted on the said supporting frame in spaced relationship to the said strawberry decapping means;
   d. pneumatic conveying means movably mounted on the said supporting frame for conveying strawberries from the said strawberry feeding means to the said strawberry decapping means;
   e. means for operating the said pneumatic conveying means;
   f. the said pneumatic conveying means including
      1. vacuum means; and
      2. air pressure means coacting with the said vacuum means for conveying the strawberries from the said strawberry feeding means into engagement with the said strawberry decapping means;
   g. means coacting with the said vacuum means and with the said air pressure means for positioning or orienting the bodies of the strawberries and the caps or stems thereon in position to enable the caps or stems on the strawberries to engage the said strawberry decapping means as the strawberries are conveyed by the said pneumatic conveying means into engagement with the said strawberry decapping means;
   h. means for conveying the bodies of the decapped strawberries away from the said strawberry decapping means after each decapping operation;

i. means coacting with the said vacuum means for removing the caps or stems from the said strawberry decapping apparatus after each decapping operation; the said vacuum means including
   1. vacuum line;
   2. the said strawberry decapping apparatus including
      a. a waste disposal receptacle for the caps or stems of the strawberries; and
      b. means coacting with the said vacuum line for discharging the decapped stems or caps of the strawberries through the said vacuum line into the said waste disposal receptacle.

33. Strawberry decapping apparatus comprising
    a. a supporting frame;
    b. decapping means mounted on the said supporting frame;
    c. strawberry feeding means mounted on the said supporting frame in spaced relationship to the said decapping means;
    d. pneumatic conveying means movably mounted on the said supporting frame for conveying strawberries from the said strawberry feeding means to the said decapping means;
    e. means for operating the said pneumatic conveying means; and
    f. the said pneumatic conveying means including
       1. vacuum means; and
       2. air pressure means coacting with the said vacuum means for conveying the strawberries from the said strawberry feeding means into engagement with the said decapping means.

34. Strawberry decapping apparatus as defined in claim 33 which includes
    a. means coacting with the said vacuum means and with the said air pressure means for positioning or orienting the bodies of the strawberries and the caps or stems thereon in position to enable the caps or stems on the strawberries to engage the said decapping means as the strawberries are conveyed by the said pneumatic conveying means into engagement with the said decapping means.

35. Strawberry decapping apparatus as defined in claim 34 which includes
    a. means for conveying the bodies of the decapped strawberries away from the decapping means after each decapping operation.

36. Strawberry decapping apparatus as defined in claim 34 which includes
    a. means coacting with the said vacuum means for removing the caps or stems from the said decapping apparatus after each decapping operation.

37. Strawberry decapping apparatus comprising:
    a. a supporting frame;
    b. strawberry decapping means mounted on the said supporting frame;
    c. first strawberry conveyor means movably mounted on the said supporting frame for conveying the strawberries into position to engage the strawberry decapping means between the cap or stem and the body of the strawberry to enable the strawberry decapping means to sever the caps or stems from the bodies of the strawberries;
    d. means for feeding the strawberries onto the said first strawberry conveyor means;
    e. cap-conveying means for conveying the severed caps or stems of the strawberries away from the said decapping means after the decapping operation;
    f. second strawberry conveyor means for conveying the bodies of the strawberries away from the said decapping means after the decapping operation;
    g. power means for operating the said first strawberry conveyor means and the said second strawberry conveyor means; and
    h. the said cap-conveying means including pneumatic means.

38. A strawberry decapping apparatus for decapping or cutting the stems or caps from the bodies of strawberries, comprising:
    a. a supporting frame;
    b. decapping means mounted on the said supporting frame for decapping the caps or stems from the bodies of the strawberries;
    c. carrier means movably mounted on the said supporting frame for moving the strawberries into engagement with the said decapping means;
    d. strawberry feeding means for feeding the strawberries into the said carrier means;
    e. means for operating the said carrier means;
    f. the said carrier means including
       1. a rotary carrier member rotatably mounted on the said supporting frame;
       2. a plurality of strawberry conveying units mounted on the said rotary carrier member at spaced intervals thereon and each adapted to receive a strawberry from the said strawberry feeding means and to convey the said strawberry into engagement with the said decapping means; and
    g. the said strawberry conveying units being in the form of generally cylindrical pocket units arranged in spiral rows on the said rotary carrier member.

39. A strawberry decapping apparatus for decapping or cutting the stems or caps from the bodies of strawberries, comprising:
    a. a supporting frame;
    b. decapping means mounted on the said supporting frame for decapping the caps or stems from the bodies of the strawberries;
    c. carrier means movably mounted on the said supporting frame for moving the strawberries into engagement with the said decapping means including
       1. a horizontally extending generally cylindrical carrier member having a horizontal axis extending from end to end thereof and including an outer peripheral surface having thereon
          a. plurality of strawberry-receiving pocket units arranged at spaced intervals axially and circumferentially on the said peripheral surface of the said generally horizontally extending cylindrical carrier member;
    d. strawberry feeding means for feeding the strawberries into the said strawberry-receiving pocket units;
    e. means for rotating the said horizontally extending generally cylindrical carrier member; and
    f. pneumatic means coacting with the said carrier means and with the said strawberry-receiving pocket units on the said horizontally extending generally cylindrical carrier member for positioning and holding the said strawberries in position to enable the stems or caps to engage the said strawberry decapping means and be severed from the bodies of the said strawberries by the said decapping means as the said strawberries are moved into engagement with the said decapping means by the said horizontally extending generally cylindrical carrier member and the said strawberry-receiving pocket units thereon.

40. A strawberry decapping apparatus as defined in claim 39 in which
 a. the strawberry feeding means is disposed above the said horizontally extending generally cylindrical carrier member; and in which the said strawberry feeding means includes
 b. means for feeding the strawberries one at a time into each of the said strawberry receiving pocket units on the said horizontally extending generally cylindrical carrier member.

41. A strawberry decapping apparatus as defined in claim 39 in which each of the said strawberry-receiving pocket units extends radially outwardly on the said peripheral surface of the said generally horizontally extending generally cylindrical carrier member from its radially inner end portion to its radially outer end portion; and in which
 a. the said pneumatic means includes
  1. air pressure means coacting with the said horizontally extending generally cylindrical carrier member for supplying air under pressure to each of the said strawberry-receiving pocket units at its radially inner end;
  2. a generally horizontally extending vacuum cylinder rotatably mounted on the said supporting frame and disposed above and extending generally parallel to the said horizontally extending generally cylindrical earlier member;
  3. vacuum means coacting with the said generally horizontally extending vacuum cylinder for applying vacuum to each of the said strawberry-receiving pocket units at its radially outer end; and
  4. means for rotating the said generally horizontally extending vacuum cylinder.

* * * * *